(12) United States Patent
Borneman et al.

(10) Patent No.: US 12,436,213 B2
(45) Date of Patent: Oct. 7, 2025

(54) OPERATING CIRCUITRY IN A MAGNETIC RESONANCE SYSTEM

(71) Applicant: Quantum Valley Investment Fund LP, Waterloo (CA)

(72) Inventors: Troy W. Borneman, Waterloo (CA); Donald Edward Carkner, Waterloo (CA); Hamidreza Mohebbi, Waterloo (CA)

(73) Assignee: Quantum Valley Investment Fund LP, Waterloo (CA)

( * ) Notice: Subject to any disclaimer, the term of this patent is extended or adjusted under 35 U.S.C. 154(b) by 0 days.

(21) Appl. No.: 18/903,414

(22) Filed: Oct. 1, 2024

(65) Prior Publication Data

US 2025/0020745 A1  Jan. 16, 2025

Related U.S. Application Data

(63) Continuation of application No. PCT/CA2024/050139, filed on Feb. 5, 2024.
(Continued)

(51) Int. Cl.
*G01R 33/36* (2006.01)
*G01R 33/34* (2006.01)

(52) U.S. Cl.
CPC ... *G01R 33/3614* (2013.01); *G01R 33/34015* (2013.01)

(58) Field of Classification Search
CPC .......... G01R 33/3614; G01R 33/34015; G01R 33/3621; G01R 33/3664; G01R 33/3607
See application file for complete search history.

(56) References Cited

U.S. PATENT DOCUMENTS 5,258,710 A   11/1993  Black et al.
7,474,099 B2   1/2009  Boesel et al.
(Continued)

FOREIGN PATENT DOCUMENTS

EP   4253981   10/2023
GB   2012806   8/1979
(Continued)

OTHER PUBLICATIONS

ISA, International Search Report and Written Opinion issued in Application No. PCT/CA2024/050139 on Jun. 13, 2024, 17 pages.
(Continued)

*Primary Examiner* — G. M. A Hyder
(74) *Attorney, Agent, or Firm* — Henry Patent Law Firm PLLC

(57) ABSTRACT

In a general aspect, a magnetic resonance system is operated. In some examples, an amplifier circuit for a magnetic resonance system includes first and second switch devices, a high-power amplifier (HPA) device, and a power combiner device. The first switch device includes an input port and two output ports. The HPA device includes an HPA input port and an HPA output port. The HPA input port is coupled to a first output port of the first switch device. The second switch device includes input and output ports. The power combiner device includes two input ports and an output port. A first input port of the power combiner device is coupled to the output port of the second switch device. A second input port of the power combiner device is coupled to the second output port of the first switch device along a path that bypasses the HPA device.

23 Claims, 11 Drawing Sheets

Related U.S. Application Data

(60) Provisional application No. 63/483,407, filed on Feb. 6, 2023.

(56) References Cited

U.S. PATENT DOCUMENTS

| | | | |
|---|---|---|---|
| 7,782,059 | B2 | 8/2010 | Devries et al. |
| 8,026,763 | B2 | 9/2011 | Dawson et al. |
| 8,593,141 | B1 | 11/2013 | Radparvar et al. |
| 10,520,566 | B2 | 12/2019 | Poole et al. |
| 11,378,633 | B2 | 7/2022 | Murakoshi et al. |
| 2015/0355297 | A1 | 12/2015 | Menon et al. |
| 2016/0033597 | A1* | 2/2016 | Gong ............... G01R 33/3664 324/322 |
| 2021/0021236 | A1 | 1/2021 | Surakitbovorn et al. |
| 2023/0243905 | A1 | 8/2023 | Gudino |

FOREIGN PATENT DOCUMENTS

| | | |
|---|---|---|
| JP | H04126184 | 11/1992 |
| WO | 2022038340 | 2/2022 |

OTHER PUBLICATIONS

Kalendra, et al., "X- and Q-band EPR with cryogenic amplifiers independent of sample temperature", Journal of Magnetic Resonance 346, Dec. 9, 2022, 9 pgs.

Simenas, et al., "A sensitivity leap for X-band EPR using a probehead with a cryogenic preamplifier", Journal of Magnetic Resonance, vol. 322, Jan. 2021, 106876, online Nov. 17, 2020, 7 pgs.

Altink, et al., "Sensitive electron paramagnetic resonance spectrometer for studying defects in semiconductors", Review of Scientific Instruments 63, 5742 (1992), 9 pages.

Artzi, et al., "Induction-detection electron spin resonance with spin sensitivity of a few tens of spins", Appl. Phys. Lett. 106, 084104 (2015), 6 pages.

Bienfait, et al., "Magnetic Resonance with Squeezed Microwaves", Physical Review X 7, 041011 (2017), 11 pages.

Bienfait, et al., "Reaching the quantum limit of sensitivity in electron spin resonance", Nature Nanotechnology | vol. 11 | Mar. 2016 253-257, 5 pages.

Devoret, et al., "Superconducting Circuits for Quantum Information: An Outlook", Science vol. 339 Mar. 8, 2013, 7 pages.

Dexheimer, et al., "Sensitivity improvement of a Varian E-109 EPR spectrometer with a low noise microwave amplifier", Review of Scientific Instruments 59, 764 (1988), 4 pages.

Eaton, et al., "A signal-to-noise Standard for Pulsed EPR,", Journal of Magnetic Resonance 205, pp. 109-113, Apr. 24, 2010.

Eichler, et al., "Electron Spin Resonance at the Level of 104 Spins Using Low Impedance Superconducting Resonators", Physical Review Letters, 118, 037701, 2017, 5 pages.

Grampp, Gunter, "Application of a microwave preamplifier to an ESR spectrometer", Review of Scientific Instruments 56, 2050 (1985), 3 pages.

Narkowicz, et al., "A cryogenic receiver for EPR", Journal of Magnetic Resonance 237 (2013) 79-84, 2013, 6 pages.

Probst, et al., "Inductive-detection electron-spin resonance spectroscopy with 65 spins/sqrt(Hz) sensitivity", Appl. Phys. Lett. 111, 202604 (2017), 6 pages.

Rinard, et al., "Absolute EPR Spin Echo and Noise Intensities", Journal of Magnetic Resonance 140, 69-83 (1999), 15 pages.

Pfenninger, et al., "Noise Analysis of EPH Spectrometers with Cryogenic Microwave Preamplifiers", Journal of Magnetic Resonance, Series A I 13, 32-39 (1995), 8 pages.

Wallace, et al., "Microstrip resonators for electron-spin resonance", Review of Scientific Instruments 62, 1754 (1991), 14 pages.

Zmuidzinas, Jonas, "Superconducting Microresonators: Physics and Applications", Annu. Rev. Condens. Matter Phys. 2012. 3:169-214, 48 pages.

\* cited by examiner

OPERATING CIRCUITRY IN A MAGNETIC RESONANCE SYSTEM

CROSS-REFERENCE TO RELATED APPLICATIONS

This application is a continuation of International Application PCT/CA2024/050139, filed Feb. 5, 2024, which claims priority to U.S. Provisional Patent Application No. 63/483,407, filed Feb. 6, 2023, entitled "Operating Circuitry in a Magnetic Resonance System." The above-referenced priority documents are incorporated herein by reference in its entirety.

BACKGROUND

The following description relates to operating circuitry in a magnetic resonance system.

Magnetic resonance systems are used to study various types of samples and phenomena. In some magnetic resonance applications, the spins in a sample are polarized by a static, external magnetic field, and a resonator manipulates the spins by producing a magnetic field at a frequency near the spins' resonance frequencies. Applications of magnetic resonance include, for example, electron paramagnetic resonance (EPR), nuclear magnetic resonance (NMR), magnetic resonance imaging (MRI) and others.

DETAILED DESCRIPTION

Figure 1:
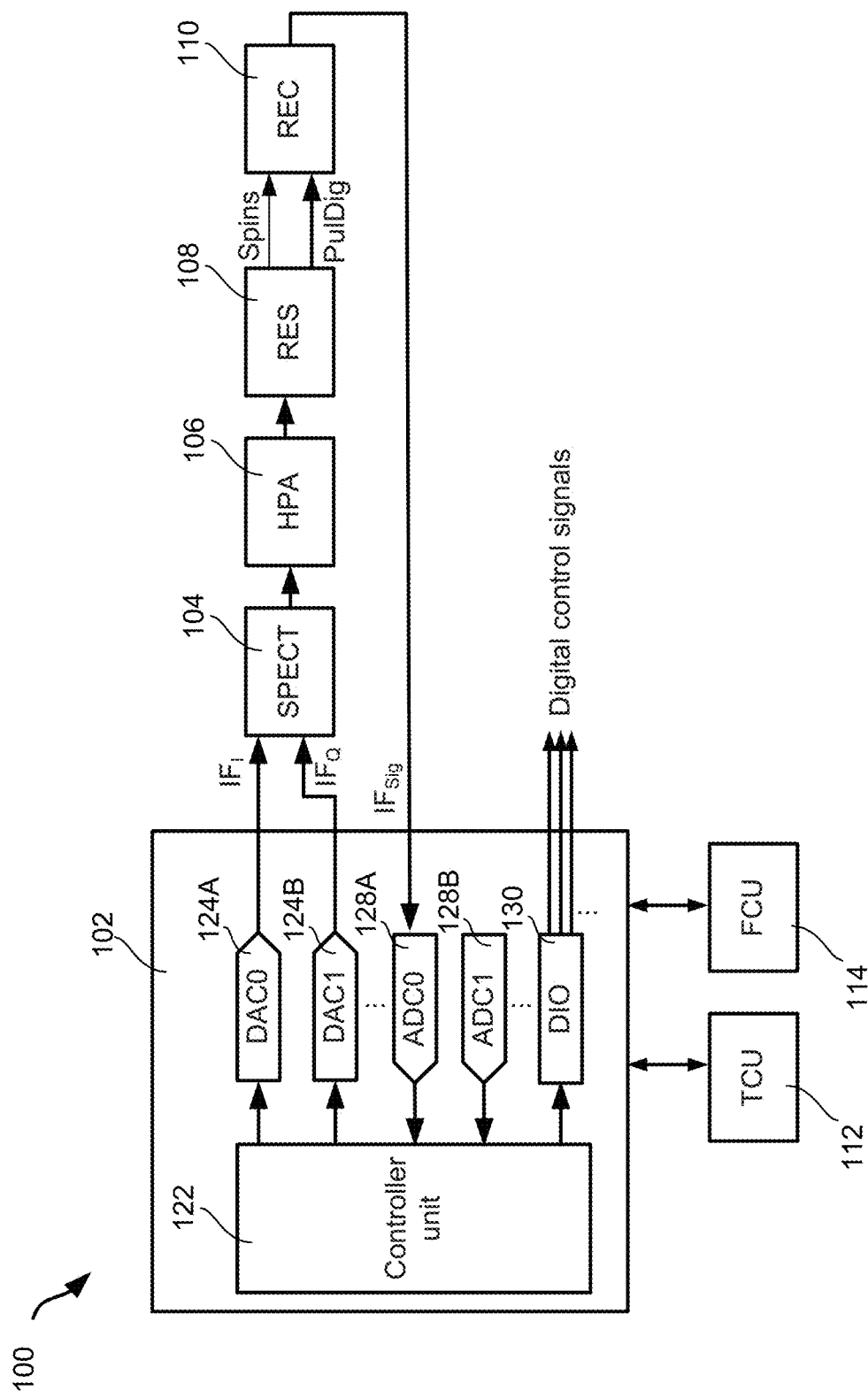
FIG. 1 is a schematic diagram showing aspects of an example magnetic resonance system.

In some aspects of what is described here, a magnetic resonance system includes electromagnetic circuits that provide new or improved operating capabilities, which may include, for example, the ability to switch among various modes of operation. In some examples, a magnetic resonance system includes hardware components and control logic that enable the magnetic resonance system to switch between a continuous-wave (CW) mode of operation and a pulsed mode of operation. In some examples, a magnetic resonance system includes hardware components and control logic that enable the magnetic resonance system to switch between a mode in which samples are measured (e.g., using continuous-wave or pulsed spectroscopy) and mode in which pulses are monitored (e.g., for transient digitization/correction, etc.). Other modes of operation may also be utilized.

In some implementations, an electromagnetic circuit includes switch devices that allow the electronic circuit to switch among distinct states that represent distinct operating modes of the magnetic resonance system. In some cases, the switch devices have fast switching times and are controlled by digital control signals, which can decrease deadtime and provide digitally controlled mode selection. In some cases, an electromagnetic circuit can operate at cryogenic temperatures, and the circuit can reduce the effects of room-temperature noise and increase power efficiency. For instance, in some examples, a switch device may be used in a cryogenic environment to prevent room-temperature noise from reaching a cryogenic low noise amplifier (LNA) device, to maximize power handling, or to provide a combination of these and potentially other advantages. In some examples, the cryogenic LNA device is phase and amplitude stable.

In some implementations, the systems and techniques described here provide technical advantages over existing technologies. For example, the size and complexity of electronic circuit components (e.g., of a high-power amplifier device) may be reduced due to more efficient conversion of voltage into control fields. In some implementations, the electromagnetic circuits described here can enable real-time monitoring of pulse transient behavior and transient impulse control, which can be used to improve the accuracy and precision of magnetic resonance control signals. In some implementations, the electromagnetic circuits described here can allow arbitrary nanosecond-timescale switching between pulsed and CW modes of operation, for instance, even in the same magnetic resonance experiment. In some cases, the systems and techniques described here can provide shared hardware resources for magnetic resonance measurements in different modes; and enable a capability to switch between pulsed and CW modes of operation without modifying the hardware of the magnetic resonance system.

In some implementations, the systems and techniques described here may allow automated operation of a magnetic resonance system, which can include automated (e.g., programmed) switching between distinct modes of operation. Such automation can increase sample throughput, for example, by allowing system control with minimal or no human intervention or modification. In some implementations, the systems and techniques described here may allow closed-loop adaptive experiment design, for example, by integrating software and system control interfaces that are designed for ease-of-automation.

Aspects of the systems and techniques described here can be adapted for various types of magnetic resonance systems. For example, electromagnetic circuits or circuit elements can be adapted for a nuclear magnetic resonance ("NMR") system, an electron paramagnetic resonance ("EPR") system, or another type of magnetic resonance system. As another example, all or part of an electromagnetic circuit may be deployed on a probe for a magnetic resonance system, or an electromagnetic circuit can be deployed in a probe-less magnetic resonance system. In some cases, an electromagnetic circuit (e.g., a resonator or other components) can be adapted to operate with liquid samples, solid samples, liquid crystal samples, biological samples (e.g., blood samples), or other types of samples to be measured or otherwise analyzed by a magnetic resonance system. As another example, certain electromagnetic circuits may operate in a cryogenic environment (e.g., at 77 K, 4 K, or other cryogenic temperatures below 273 K), or an electromagnetic circuit may operate at non-cryogenic temperatures including room temperatures.

In some cases, the systems and techniques described here can be compatible with multiple different types of resonators, cryogenic systems, probe configurations and other components in a variety of magnetic resonance systems. For example, electronic circuits can be designed for compatibility with non-superconducting resonators and superconducting resonators (which may include superconducting resonators fabricated from a variety of superconducting materials). The resonator can be, for example, a microstrip, a cavity, a coil, a coplanar waveguide, or another type of resonator for magnetic resonance systems. Additionally, the resonator could be, for example, a rectangular cavity resonator, a cylindrical cavity resonator, a dielectric resonator, a loop gap resonator, or any lumped element resonator. In some cases, the electronic circuits presented here can be deployed in a variety of cryogenic systems, including, for example, compact closed-cycle systems, open-cycle, liquid cryogen systems and others. In some cases, the electronic circuits presented here can be deployed in a variety of compact probe designs, which may enable low-noise cryogenic receiver amplifiers to be used in a variety of configurations without disturbing sample changing methods. In some cases, a combination of these and potentially other advantages and improvements may be obtained.

Aspects of the systems and techniques described here can be adapted for various types of applications. For example, the systems and techniques described here may be used for structural biology measurements, for instance, to measure structural properties of proteins or protein complexes in a biological sample (e.g., a blood sample, a urine sample, or another type of biological sample). Such measurements can be useful in clinical applications, for example, diagnostics, treatments, pharmaceutical drug discovery/development and understanding the structure and function of membrane proteins, and other applications.

FIG. 1 is a schematic diagram showing aspects of an example magnetic resonance system 100. Generally, the magnetic resonance system 100 can be an EPR system, an NMR system, or another type of magnetic resonance system. The example magnetic resonance system 100 includes a signal processing unit 102, a spectrometer unit 104, an amplifier unit 106, a resonator unit 108, a receiver unit 110, a temperature control unit (TCU) 112, and a field control unit (FCU) 114. In some examples, each of the units of the magnetic resonance system 100 may include an associated electronic circuit and other components, including housings, ports, etc. In some examples, the example magnetic resonance system 100 may include additional or different components, and the components may be arranged as shown or in another manner.

As shown in FIG. 1, the signal processing unit 102 includes a controller unit 122, digital-to-analog converter (DAC) devices 124, analog-to-digital converter (ADC) devices 128, and a digital input/output (DIO) unit 130. In some examples, the signal processing unit 102 may include additional or different components, and the components may be arranged as shown or in another manner. For example, although two DAC devices (124A, 124B) and two ADC devices (128A, 128B) are shown in FIG. 1, the signal processing unit 102 may include additional DACs and ADCs, as well as additional DIOs units, etc. In some instances, the ADC device 128B may be an auxiliary device and may be configured to receive and process signals from the units within the magnetic resonance system 100 in FIG. 1, or a different system. As another example, the signal processing unit 102 may include one or more central processing units (CPUs), memory units, and computer elements. The one or more CPUs may interface with the controller unit 122 for sending control signals and receiving data; and may interface with the TCU 112 and the FCU 114. The CPUs may be controlled by software and execute a preconfigured program stored in the memory unit for performing a magnetic resonance experiment.

In some implementations, the controller unit 122 controls output of the DAC devices 124 and input of the ADC devices 128; generates digital control signals; and synchronizes phases and timing across several components in the magnetic resonance system 100. In the example shown, the signal processing unit 102 delivers analog control signals to the spectrometer unit 104. The analog control signals generated by the signal processing unit 102 may be implemented as amplitude, phase, and frequency modulation of an intermediate frequency (IF) carrier signal. In the example shown, the signal processing unit 102 also delivers digital control signals to other components (e.g., the spectrometer unit 104, the amplifier unit 106, the resonator unit 108, the receiver unit 110, etc.) in the magnetic resonance system 100. For example, the digital control signals can be delivered to switch devices (e.g., the switch devices 202, 206, 402, 406, 602, 606 in FIGS. 2, 4A-4B, and 6A-6B) or other types of electronic components. The signal processing unit 102 can receive magnetic resonance detection signals and/or sensor output signals from devices in the resonator unit 108. These signals may be received as amplitude, phase, and frequency modulation of an IF carrier and can be digitized for further processing (e.g., for measurement, pulse transient control and correction, etc.). In some instances, the controller unit 122 may include a field-programmable gate array (FPGA) device, a digital signal processing (DSP) unit, or another type of data processing apparatus.

In some implementations, the controller unit 122 is configured to send digital signals to the DAC devices 124A, 124B; to receive digital signals from the ADC devices 128A, 128B; and to send digital control signals to the DIO unit 130. The signal processing unit 102 may be configured to perform signal averaging and digital signal processing. In particular, the controller unit 122 may be configured to generate amplitude-, phase-, and frequency-modulated AWG pulses at a digital intermediate frequency (IF). Output signals from the DAC devices 124A, 124B, the ADC devices 128A, 128B, and the DIO unit 130 can be synchronized in time (e.g., phase coherent) and controlled by the controller unit 122 according to a pulse program. In some implementations, acquisition of signals from the resonator device in the resonator unit 108 can be digitized phase-coherently at IF and digitally demodulated for phase-sensitive detection, which can also be controlled by the controller unit 122. In some implementations, the signal processing unit 102 allows digital pulse generation and detection with time-synchronous, phase-coherent DAC, ADC, and DIO operations.

In the example shown, the DAC devices 124A, 124B are configured to generate analog IF I-quadrature and Q-quadrature control signals from a digital IF signal, and the ADC devices 128A, 128B are configured to digitize magnetic resonance detection signals (e.g., spin signals) or sensor output signals and send the digitized signals to the controller unit 122 for processing. The example DIO unit 130 converts digital control toggle signals from the controller unit 122 to the digital control signals. The digital control signals can be time-locked to the analog IF control signals generated at the DAC devices 124A, 124B, and the magnetic resonance detection signals or the sensor output signals received at the ADC devices 128.

The spectrometer unit 104 may include microwave or radio frequency hardware components (e.g., switches, mixers, amplifiers, attenuators, etc.) that generate and receive microwave or radio frequency signals. For instance, the spectrometer unit 104 may be configured to process single sideband X-band (8-12 GHz) signals. In some implementations, the spectrometer unit 104 includes a low phase noise microwave synthesizer to generate system master oscillator signals and analog spectrometer local oscillator signals, an IQ mixer device to upconvert microwave control pulses to a single sideband signal that can be applied to the resonator unit 108 and to provide local oscillator suppression and image suppression (controlled by $f_{IF}^{1}$ and $f_{IF}^{Q}$), a bandpass filter device to suppress noise outside spectrometer bandwidth on a transmitter side, and other circuit components. In some implementations, the spectrometer unit 104 can receive analog IF control signals from the signal processing unit 102 and output upconverted magnetic resonance control signals. In some implementations, the magnetic resonance control signals have frequencies in a radio frequency or microwave regime. In the example shown in FIG. 1, the magnetic resonance control signals from the spectrometer unit 104 are passed to the amplifier unit 106.

In some implementations, the amplifier unit 106 can be digitally controlled to perform fast switching between pulse and continuous-wave modes of operation. For example, the amplifier unit 106 can be digitally controlled by digital control signals from the signal processing unit 102. In some instances, the amplifier unit 106 may include one or more switch devices and an HPA device. The example amplifier unit 106 includes an amplifier circuit, which may be implemented as the example amplifier circuit 200 in FIG. 2 or in another manner. In some implementations, the amplifier unit 106 operates in an elevated temperature, e.g., room temperature, outside of a cryogenic environment.

In some implementations, the resonator unit 108 operates in a cryogenic environment at one or more cryogenic temperatures, for example, in a cryostat. In some implementations, the resonator unit 108 operates in an elevated temperature, e.g., room temperature, outside of a cryogenic environment. The example resonator unit 108 may include an amplifier device (e.g., a cryogenic LNA device), which can be integrated with or otherwise connected to a resonator device. The resonator unit 108 can be controlled to switch between modes of operation, for example, between a magnetic resonance measurement mode and a pulse transient digitizing/correcting mode. The example resonator unit 108 may include, for example, a resonator device for generating an electromagnetic field in a sample region of the magnetic resonance system, signal wirings for communicating microwave signals and digital control signals, cryogenic receiver components, and internal hardware for temperature setting and stabilization. The resonator unit 108 includes a resonator circuit, which may be implemented as any of the example resonator circuits 400, 430, 600, 630 in FIGS. 4A-4B, 6A-6B, or in another manner.

In some implementations, the receiver unit 110 includes a mixer device for converting signals (e.g., magnetic resonance detection signals from a resonator, sensor signals from a sensor device) received from the resonator unit 108 to an intermediate frequency ($f_{IF}$), by mixing the received signals with a local oscillator frequency ($f_{LO}$). The receiver unit 110 may also include a filter device that removes unwanted frequency components, for example, a bandpass IF filter device that rejects frequencies near a frequency value of $f_{LO}$-$f_{IF}$ from the mixer device and suppresses noise outside the receiver bandwidth ($\pm f_{IF}$). The receiver unit 110 may also include other components such as, for example, an IF amplifier device, a lowpass filter device, and other circuit components. In some implementations, the receiver unit 110 is configured for down-conversion of a magnetic resonance detection signal or a sensor signal to an IF signal. In some instances, the receiver unit 110 includes various stages of filtering and amplification to reduce noise bandwidth. The example receiver unit 110 shown in FIG. 1 can accept both low-level spin signal inputs and high-level pulse transient digitizing inputs.

In some implementations, the TCU 112 can be configured and operated to monitor and stabilize the temperature of the cryogenic environment where the resonator unit 108 resides. For example, the TCU 112 may measure and stabilize temperatures of various components using closed loop feedback control. In some instances, the FCU 114 can be configured and operated to monitor, stabilize, and vary a primary magnetic field in the magnetic resonance system. The primary magnetic field is the external $B_0$ field (the quantizing field) that is applied to the sample region and is generated by a primary magnet system, which can be implemented as an electromagnet, a permanent magnet, a superconducting magnet, or another type of magnet system. For example, the FCU 114 may measure and stabilize a quantizing magnetic field using closed loop feedback control. The FCU 114 of the magnetic resonance system 100 may include a magnet configured to generate magnetic fields corresponding to X-band spin resonance (e.g., a field strength in the range of approximately 0-4000 G).

In some instances, the example magnetic resonance system 100 may include other components. For example, the magnetic resonance system 100 may include an electromagnet power supply and a Hall probe which interface with the FCU 114 to receive control signals from the FCU 114 and apply appropriate current to the primary magnet system. The example magnetic resonance system 100 may include a cryostat cooled by Helium or Nitrogen which can be maintained at a cryogenic temperature (e.g., equal to or less than 1 K or another cryogenic temperature). In some instances, a cryostat of the example magnetic resonance system 100 includes internal control hardware for temperature setting and stabilization.

In some aspects of operation, a primary magnet system generates a primary magnetic field in a controlled environment of a sample region in the magnetic resonance system 100. The primary magnetic field is applied to a sample in a sample region that is typically near a resonator in the resonator unit 108. In various implementations, the primary magnetic field can be homogeneous over the volume of the sample region. In some instances, a gradient system generates one or more gradient fields that spatially vary over the sample region. Generally, the primary magnetic field generated by the primary magnet system quantizes the spin states and sets the Larmor frequency of the spin ensemble.

In some aspects of operation, a spin ensemble in the sample interacts with a resonator device in the resonator unit 108. Control of spins in the sample can be achieved, for example, by a radiofrequency or microwave magnetic field generated by the resonator device. The drive frequency can be tuned to the spins' resonance frequency, which is determined by the strength of the primary magnetic field and the gyromagnetic ratio of the spins. The spins can be a collection of particles having non-zero spin that interact magnetically with the applied fields. For example, the spin ensemble can include nuclear spins, electron spins, or a combination of nuclear and electron spins. Examples of nuclear spins include hydrogen nuclei (1H), carbon-13 nuclei (13C), and others. In some implementations, the spin ensemble is a collection of identical spin –½ free electron spins attached to an ensemble of large molecules.

In the example shown in FIG. 1, the spectrometer unit 104 and the amplifier unit 106 are electromagnetically coupled to (e.g., by coaxial cables, waveguides, etc.), and adapted to communicate with, the resonator unit 108. For example, the amplifier unit 106 can be adapted to provide a voltage or current signal that drives the resonator in the resonator unit 108. In the example shown in FIG. 1, the receiver unit 110 acquires magnetic resonance data based on control signals delivered to the resonator unit 108. For example, the receiver unit 110 may receive magnetic resonance detection signals generated by an interaction between the resonator and samples contained in the resonator unit 108 based on the magnetic resonance control signals received at the resonator device.

In some cases, the signal processing unit 102 communicates with a computer system. The computer system may include one or more digital electronic controllers, microprocessors, or other types of data-processing apparatus. The computer system may include memory, processors, and may operate as a general-purpose computer, or the computer system may operate as an application-specific device. The computer system may be used for generating control sequences (e.g., pulse sequences), analyzing or displaying data, obtaining pulse programs or user input (e.g., through a user interface, through a communication port, or otherwise), or other types of operation.

In some aspects of operation, the example magnetic resonance system 100 operates in a continuous wave (CW) mode of operation, for example, using CW EPR spectroscopy or CW NMR spectroscopy methodology. In a typical continuous wave (CW) spectroscopy experiment, the resonator applies a low-power, continuous excitation field (e.g., a radio frequency or microwave frequency Rabi field) to the sample over a time period that is relatively long (e.g., relative to characteristic relaxation times) in order to bring the spin ensemble to a steady state. The resonance frequencies of the spins are swept over a range (by sweeping the principal magnetic field), and the resulting response spectrum is measured.

In some aspects of operation, the example magnetic resonance system 100 operates in a pulsed mode of operation, for example, using pulsed-EPR spectroscopy or pulsed-NMR spectroscopy methodology. In a typical pulsed spectroscopy experiment, the resonator applies a sequence of intense, high-power pulses (e.g., radio frequency or microwave pulses) to the sample, while the principal magnetic field is held constant. The resulting state of the spins can then be observed, for example, by acquiring a free induction decay (FID), which can then be Fourier transformed to obtain a spectrum.

The example magnetic resonance system 100 includes electronic components for both CW and pulsed modes of operation, which allows the system 100 to switch between these modes of operation without hardware modification or other intervention. For instance, the controller unit 122 may cause the amplifier unit 106 and the resonator unit 108 to switch from a CW mode of operation to a pulsed mode of operation, or from a pulsed mode of operation to a CW mode of operation; the mode of operation can be selected, for example, by controlling one or more of the digital control signals produced by the DIO unit 130.

In some aspects of operation, the example magnetic resonance system 100 operates in a normal mode of magnetic resonance measurement. For example, the magnetic resonance system 100 may perform CW EPR or CW NMR spectroscopy measurements, pulsed ESR or pulsed NMR spectroscopy measurements, or other types of magnetic resonance experiments. In these modes of operation, magnetic resonance control signals are delivered to the resonator (in the resonator unit 108), which causes the resonator to generate a magnetic resonance control field (e.g., a pulse or a CW field) that is applied to spins in a sample; a magnetic resonance detection signal is obtained (e.g., due to an interaction between the spins and the resonator) and processed in order to measure the spins' response to the control field.

In some aspects of operation, the example magnetic resonance system 100 operates in an pulse observation mode (also referred to as pulse transient digitization/correction mode) of operation. In a pulse observation mode, magnetic resonance control signals are delivered to the resonator (in the resonator unit 108) in order to observe the magnetic resonance control signals that are delivered to the resonator and/or to observe the magnetic resonance control field generated by the resonator. By observing the magnetic resonance control signals at the resonator and/or observing the magnetic resonance control field produced by the resonator, the control signals can be more accurately calibrated and errors can be corrected. Generally, the magnetic resonance control signals, as seen by the resonator in the resonator unit 108, are not identical to the magnetic resonance control signals as they are produced by the spectrometer unit 104. Similarly, the magnetic resonance control fields, as seen by the sample in the resonator unit 108, are not identical to the predicted control fields. These types of discrepancies can be measured (e.g., by digitizing and analyzing the observed signals), and enhanced control techniques can be implemented to improve the precision and accuracy of control achieved by the magnetic resonance control signals. For instance, control sequences can be calibrated to account for pulse transients and other types of noise.

The example magnetic resonance system 100 includes electronic components for both normal and pulse observation modes of operation, which allows the system 100 to switch between modes of operation without hardware modification or other intervention. For instance, the controller unit 122 may cause the resonator unit 108 to switch from a pulse observation mode of operation to a normal mode of operation, or from a normal mode of operation to a pulse observation mode of operation; the mode of operation can be selected, for example, by controlling one or more of the digital control signals produced by the DIO unit 130. As an example, the magnetic resonance system 100 may operate in pulse observation mode in order to observe (and potentially account for) pulse transients or other types of phenomena, and then switch to a normal mode of magnetic resonance measurement to measure a sample.

Figure 2:
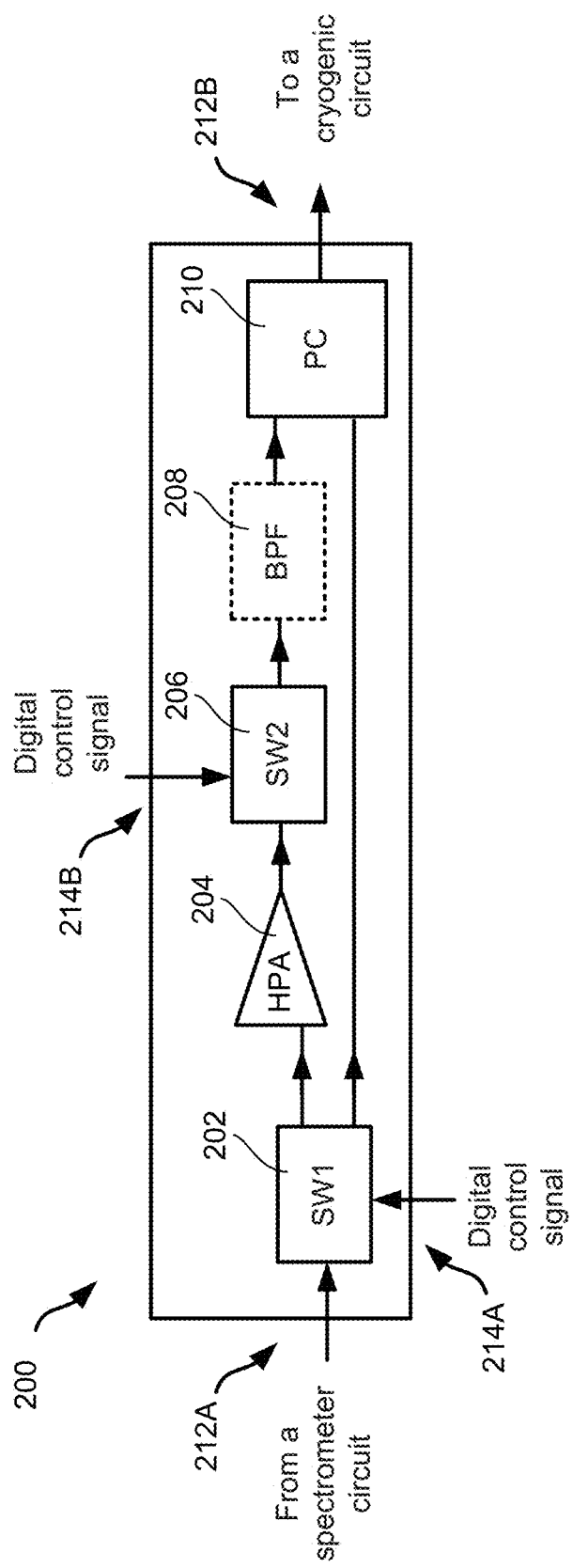
FIG. 2 is a schematic diagram showing aspects of an example amplifier circuit.

FIG. 2 is a schematic diagram showing aspects of an example amplifier circuit 200. In some implementations, the example amplifier circuit 200 is deployed as part of a magnetic resonance system, e.g., in the bypass unit 106 of the example magnetic resonance system 100 in FIG. 1. The example amplifier circuit 200 can be used in a magnetic resonance experiment and is configured to switch the magnetic resonance system between a continuous-wave mode of operation and a pulsed mode of operation. As shown in FIG. 2, the example amplifier circuit 200 includes various circuit components including a first switch device 202, a high-power amplifier (HPA) device 204, a second switch device 206, a bandpass filter device 208, and a power combiner device 210, which are arranged between an input port 212A and an output port 212B of the amplifier circuit 200. In some implementations, the example amplifier circuit 200 includes interfaces that are configured to connect the circuit components to one another, for example, through waveguides, co-axial cables, metal wires or feedlines, or another type of signal lines.

In some instances, the example amplifier circuit 200 resides in an environment of elevated temperature (e.g., room temperature) outside a cryogenic environment where a resonator device and possibly other parts of the magnetic resonance system reside. In some implementations, the example amplifier circuit 200 receives a magnetic resonance control signal from a spectrometer circuit (e.g., in the spectrometer unit 104 in FIG. 1) at the input port 212A and delivers an output signal to a resonator circuit (e.g., in the resonator unit 108 in FIG. 1) via the output port 212B. The example amplifier circuit 200 may include additional or different components, and the components may be arranged as shown or in another manner. For example, the bandpass filter device and limiter device can be configured at various locations in the amplifier circuit 200. In some instances, the example amplifier circuit 200 may be operated according to operations in the example process 300 in FIG. 3, based on the type of control sequence shown in FIGS. 8A-8B, or in another manner.

As shown in FIG. 2, the first switch device 202 has an input port, a first output port, a second output port, and a control port; the HPA device 204 has an HPA input port and an HPA output port; the second switch device 206 includes an input port, an output port, and a control port; and the power combiner device 210 includes a first input port, a second input port and an output port. The input and output ports of the various circuit components of the amplifier circuit 200 are illustrated by arrows on signal lines connecting between the circuit components in FIG. 2. In the example shown, the input port of the first switch device 202 is coupled to the input port 212A of the amplifier circuit 200; the first output port of the first switch device 202 is coupled to the HPA input port of the HPA device 204; and the HPA output port of the HPA device 204 is coupled to the input port of the second switch device 206. Furthermore, the output port of the second switch device 206 may be coupled to the first input port of the power combiner device 210; the second output port of the first switch device 202 is coupled to the second input port of the power combiner device 210; and the output port of the power combiner device 210 is coupled to the output port 212B of the amplifier circuit 200.

In the example amplifier circuit 200, the bandpass filter device 208 allows passing of an input signal within a specified frequency range, for example, to remove switching transients. In some instances, the bandpass filter device 208 may have a center frequency at or near the spin resonance frequency $f_0$ and a bandwidth of $4f_{IF}$; or the bandpass filter device 208 may have other characteristics (e.g., a larger bandwidth). A bandpass filter device 208 may reside at various locations within the example amplifier circuit 200. For example, the bandpass filter device 208 may reside between the HPA device 204 and the second switch device 206. In this case, an input port of the bandpass filter device 208 is coupled to the HPA output port of the HPA device 204 and an output port of the bandpass filter device 208 is coupled to the input port of the second switch device 206. For example, the bandpass filter device 208 may reside between the second switch device 206 and the power combiner device 210. In this case, the input port of the bandpass filter device 208 is coupled to the output port of the second switch device 206 and the output port of the bandpass filter device 208 is coupled to the first input port of the power combiner device 210. For another example, the bandpass filter device 208 may reside between the power combiner device 210 and the output port 212B. In this case, the input port of the bandpass filter device 208 is coupled to the output port of the power combiner device 210 and the output port of the bandpass filter device 208 is coupled to the output port 212B of the example amplifier circuit 200. In certain instances, the bandpass filter device 208 may be coupled to the rest of the components of the amplifier circuit 200 in a different manner.

In some implementations, the example amplifier circuit 200 includes one or more control ports 214 for receiving control signals. As shown in FIG. 2, the example amplifier circuit 200 includes a first control port 214A connected to the control port of the first switch device 202 and a second control port 214B connected to the control port of the second switch device 206. In some implementations, the example amplifier circuit 200 receives digital control signals at the first and second control ports 214A, 214B, e.g., from the signal processing unit 102 of the magnetic resonance system 100 in FIG. 1. For example, each of the digital control signals may be a transistor-transistor logic (TTL) signal with two TTL logic levels. In this case, the digital control signal is a single-bit control signal and has two states. When the TTL signal is in a first state (e.g., a voltage in a range of 1.5-5 volt (V)), the TTL logic level is a digital "1" or at a logical high level; and similarly, when the TTL signal is in a second state (e.g., a voltage in a range of 0-0.7 V), the TTL logic level is a digital "0" or at a logical low level. In some instances, the TTL logic level may be in another range; and the digital control signal received at the first and second control port 214A and 214B may be another type of digital signal. In some implementations, the switching time of the first and second switch devices 202, 206 which allows the switching between a pulsed mode of operation and a continuous-wave mode of operation can be within nanosecond (ns) timescales, tens of ns scales, or another timescale.

In some implementations, input and output ports of switch devices may be selectively coupled or decoupled according to a state of a digital control signal. The input port of a switch device may be considered coupled to an output port of the switch device when the switch devices is configured to deliver a signal from the input port to the output port with no attenuation or negligible attenuation. Similarly, the input port of a switch device may be considered decoupled from an output port of the switch device when the switch devices is configured to provide negligible transmission of a signal from the input port to the output port of the switch device; for instance, the switch device may completely block the signal or substantially attenuate the signal (e.g., with an attenuation level equal to or greater than a threshold value). In some instances, a threshold value of the attenuation level of signals between the input and output ports of the first switch device 202 is equal to or greater than is 30 dB; and a threshold value of the attenuation level of signals between the input and first or second output ports of the second switch device 206 is equal to or greater than 50 dB. The switch devices (202, 206) may be implemented with other properties (e.g., higher or lower threshold values).

In some implementations, the first switch device 202 is configured to switch between a first state and a second state in response to a change in the state of the first digital control signal at the first control port 214A. When the first digital control signal received at the first switch device 202 is in a first state (e.g., the logic high level), the first switch device 202 is in the first state where the input port is coupled with the first output port of the first switch device 202. While the first switch device 202 is in the first state, the first switch device 202 delivers the magnetic resonance control signal from the input port to the first output port of the first switch device 202 with no attenuation or negligible attenuation. Under the first state of the first switch device 202, the input port is also decoupled from the second output port of the first switch device 202. When the input port is decoupled from the second output port of the first switch device 202, a signal pathway in the first switch device 202 defined between the input port and the second output port provides enough attenuation so that transmission of the magnetic resonance control signal on the signal pathway is negligible; and effectively, there is no or negligible output signal at the second output port of the first switch device 202. In this case, the magnetic resonance control signal at the input port 212A of the amplifier circuit 200 is a first magnetic resonance control signal received from the spectrometer circuit at the input port 212A. In some implementations, the first magnetic resonance control signal can be, for example, a high-power microwave pulse of a given frequency v at a constant magnetic field $B_0$ that is used for a pulsed magnetic resonance measurement.

Similarly, when the first digital control signal is in the second state (e.g., the logic low level), the first switch device 202 is in the second state for coupling the input port to the second output port of the first switch device 202, which allows delivery of the magnetic resonance control signal from the input port to the second output port of the first switch device 202 with no attenuation or negligible attenuation. Under the second state of the first switch device 202, the input port is also decoupled from the first output port of the first switch device 202. When the input port is decoupled from the first output port of the first switch device 202, a signal pathway in the first switch device 202 defined between the input port and the first output port provides enough attenuation so that transmission of the input signal on the signal pathway is negligible; and effectively, there is no or negligible output signal at the first output port of the first switch device 202. In this case, the input signal at the input port 212A of the amplifier circuit 200 is a second magnetic resonance control signal received from the spectrometer unit 104 of the magnetic resonance system 100. In some implementations, the second magnetic resonance control signal can be a microwave irradiation field of a constant frequency v and sweeping the external magnetic field $B_0$ (or a microwave irradiation field of a constant field $B_0$ and sweeping the frequency v) for the continuous-wave magnetic resonance measurement.

Consequently, when the first switch device 202 is in the second state, the second magnetic resonance control signal received at the first switch device 202 is passed on a path that bypasses the HPA device 204 so that noise from the HPA device 204 does not degrade the second magnetic resonance control signal. In some implementations, the switch time of the first switch device 202 is in a range of 5-20 ns, equal to or less than 200 ns, equal to or less than 1 microsecond (μs), or in another range. In some implementations, the first switch device 202 can receive and handle a magnetic resonance control signal with a power value of up to 1 watt (W), or in another range.

In some instances, the first switch device 202 has two or more states. For example, the first switch device 202 is switched to a third state where the input port is coupled with the second output port of the first switch device 202, which allows delivery of the magnetic resonance control signal from the input port to the second output port of the first switch device 202 with no attenuation or negligible attenuation. Under the third state of the first switch device 202, the input port is also coupled to the first output port of the first switch device 202 with an attenuation (e.g., in a range of 40-50 dB or another range. In some examples, the attenuated magnetic resonance control signal at the first output port of the first switch device 202 may be used in the magnetic resonance system or in another process.

In some implementations, the HPA device 204 receives the magnetic resonance control signal from the first output node of the first switch device 202, amplifies the received magnetic resonance control signal, and passes an amplified magnetic resonance control signal to the second switch device 206.

Figure 8A:
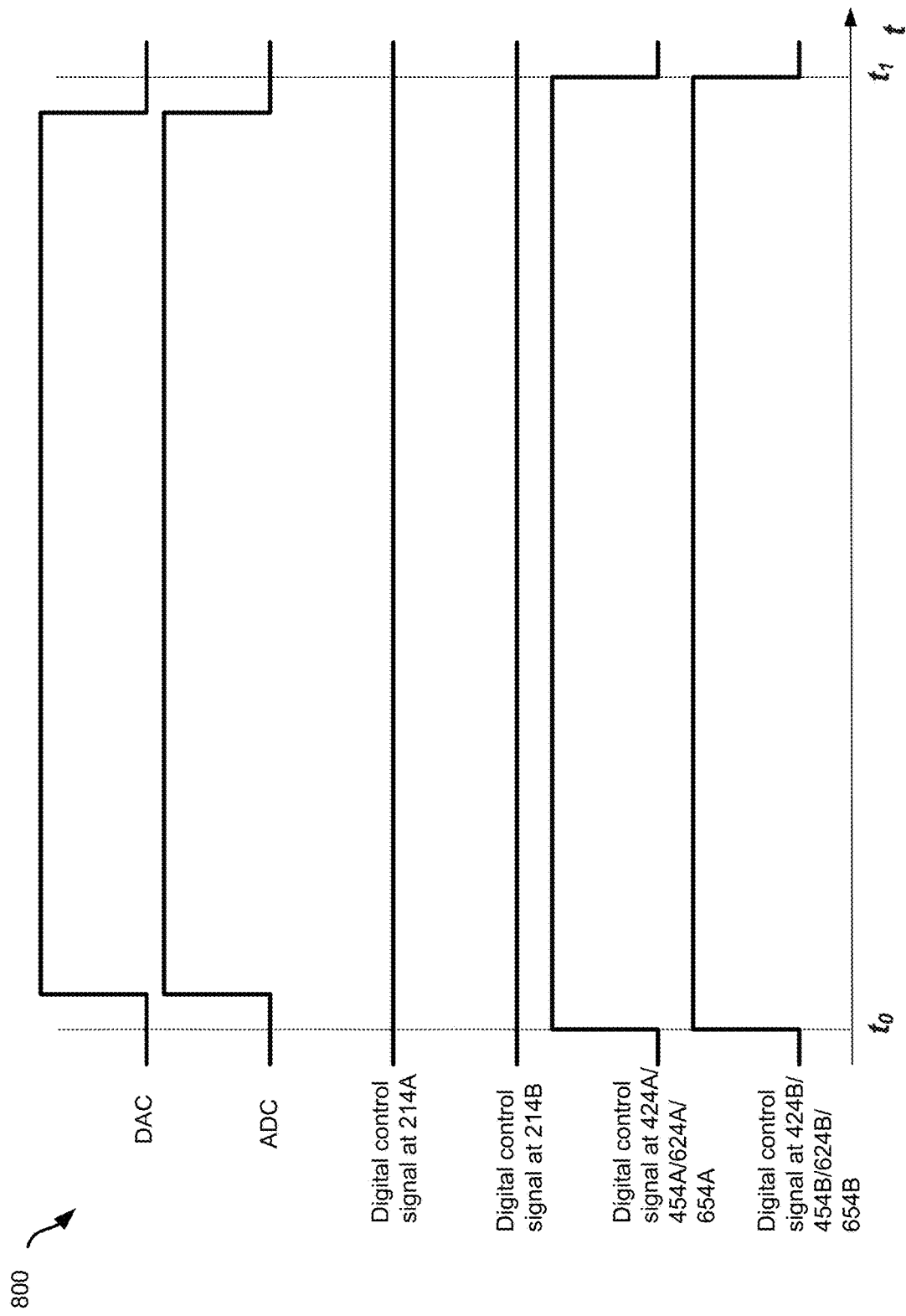
FIG. 8A, 8B are timing diagrams showing aspects of example control sequences.
Figure 8B:
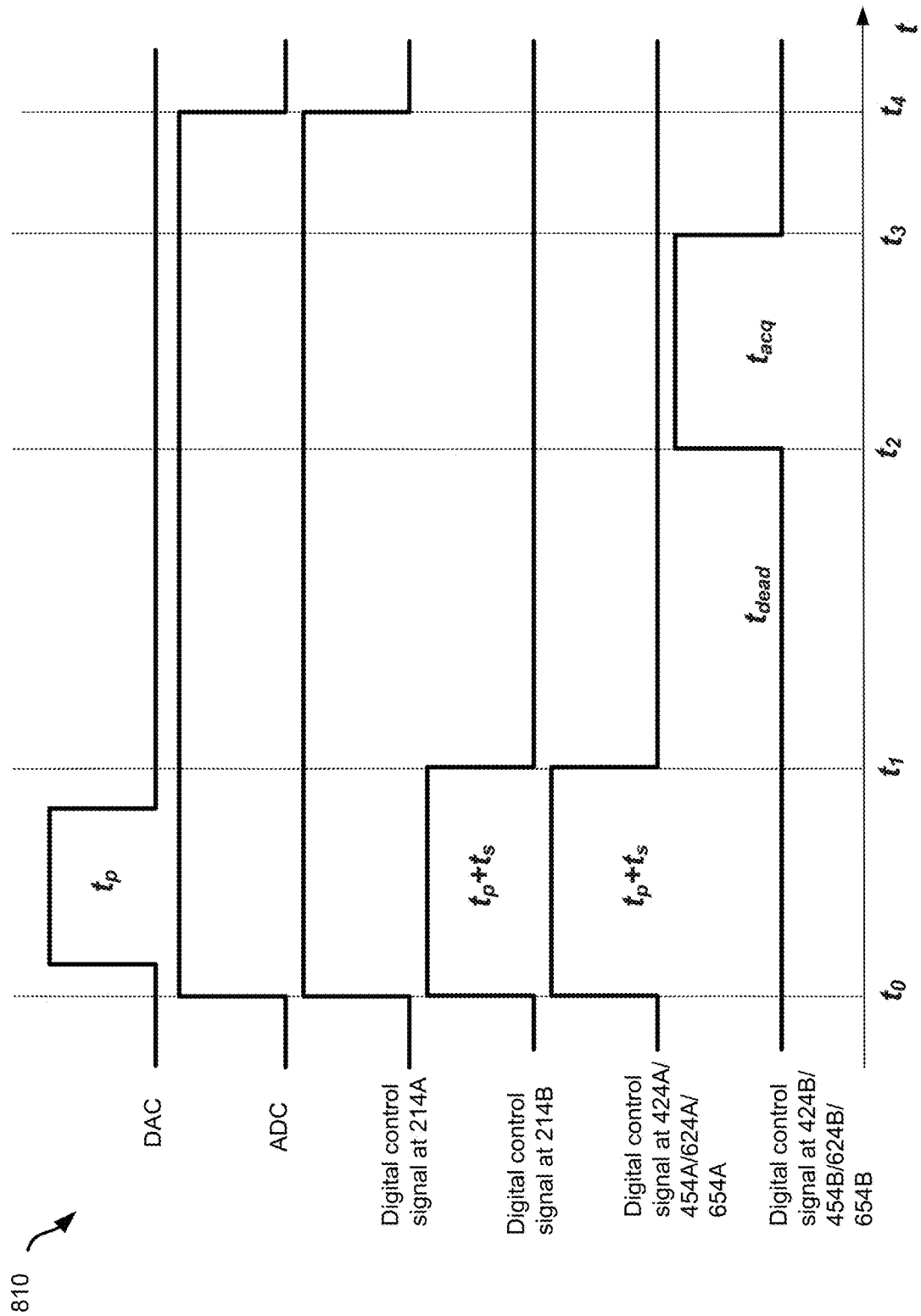

In some implementations, during a continuous-wave magnetic resonance measurement, the first and second switch devices 202, 206 are in the second states during the same time period ($t_1-t_0$) according to the states of the digital control signals received at the control ports as defined in the control sequences in FIG. 8A. In some implementations, the second switch device 206 is configured for HPA blanking during a pulsed magnetic resonance measurement. For example, when the first digital control signal at the first control port 214A and the second digital control signal at the second control port 214B are both in a first state (e.g., at the logical high level) for a first time period (e.g., $t_4-t_0$ in FIG. 8B), the input port is coupled to the output port of the second switch device 206; and the amplified magnetic resonance control signal is delivered from the input port to the output port of the second switch device 206 during the first time period; and when the first digital control signal at the first control port 214A remains in the first state and the second digital control signal is switched to a second state (e.g., the logical low level) for a second time period (e.g., $t_4-t_1$ in FIG. 8B), the input port is decoupled from the output port of the second switch device 206 and the amplified magnetic resonance control signal is blanked (e.g., the amplified magnetic resonance control signal at the output port of the second switch device 206 is negligible) during the second time period. In some implementations, the second time period at least includes a dead time ($t_{dead}=t_2-t_1$) immediately after the first time period and an acquisition time ($t_{acq}=t_3-t_2$), as shown in FIG. 8B. In some implementations, the switch time of the second switch device 206 is in a range of 5-20 ns, equal to or less than 200 ns, equal to or less than 1 μs, or in another range. In some implementations, the second switch device 206 can receive and handle an input signal with a power up to 1 W, or in another range. In some instances, the second switch device 206 can be configured to handle higher power, for an example, in a range of more than 1 W; up to tens of Watts, up to 10 kilowatts (KW), or another range according to the HPA device 204.

In some implementations, the first switch device 202 is a single-pole, double-throw switch device; and the second switch device 206 is a single-pole, single-throw switch device. In some instances, each of the first and second switch devices 202, 206 may be another type of switch device. For example, each of the first and second switch devices 202, 206 may have any number of poles, any number of throws, any number of input ports, output ports, and control ports. In some instances, each of the first and second switch devices 202, 206 may include more than two states. In some instances, the control port of each of the first and switch devices 202, 206 may interface with one-bit control line, two-bit control line, or other multi-bit control line for receiving different types of digital control signals.

In some implementations, the power combiner device 210 combines signals received at the first and second input ports of the power combiner device 210 and passes the combined signals to the output port of the power combiner device 210 (e.g., the output port 214B of the example amplifier circuit 200).

Figure 3:
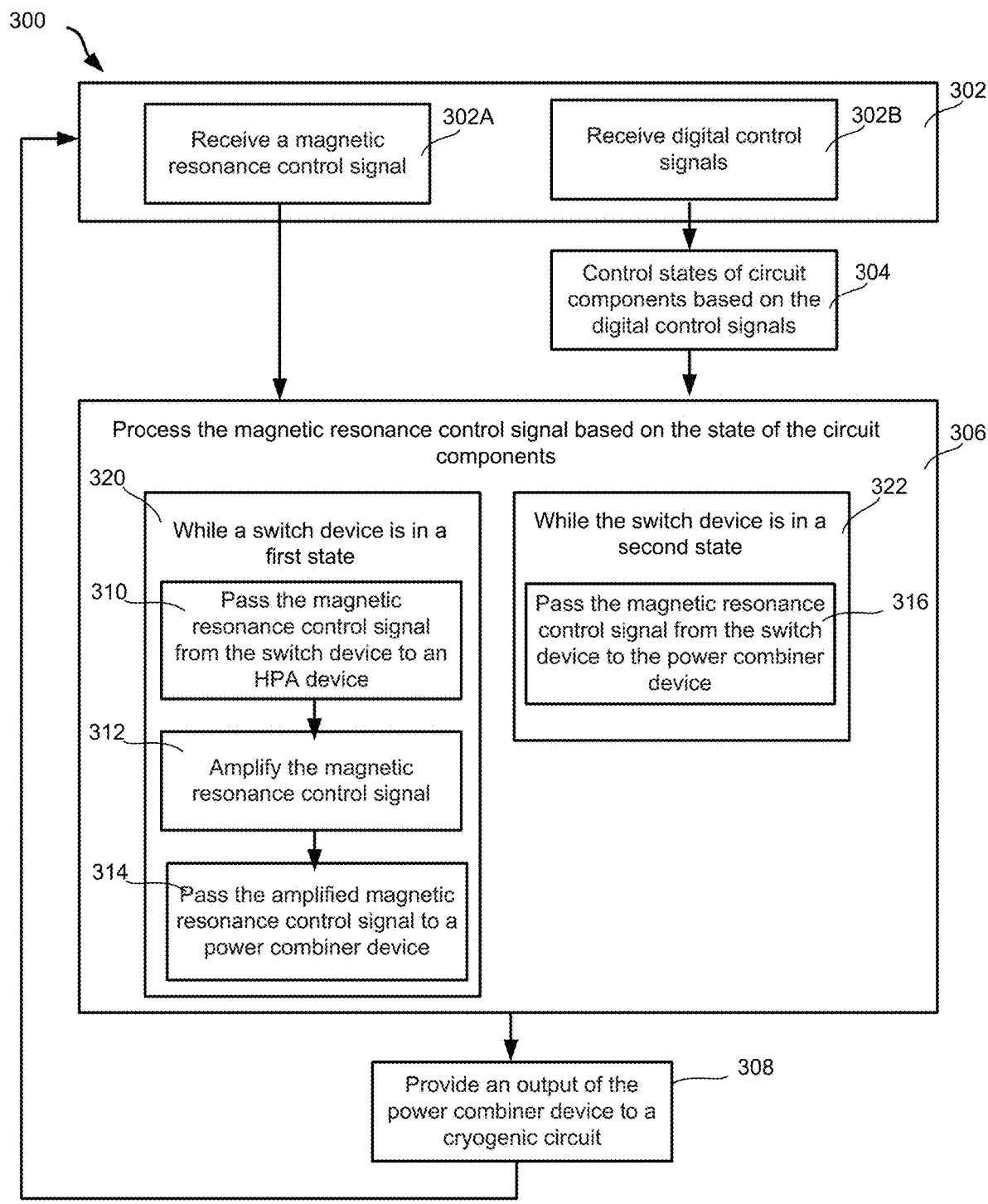
FIG. 3 is a flow diagram showing aspects of an example process for operating the example amplifier circuit shown in FIG. 2.

FIG. 3 is a flow diagram showing aspects of an example process 300. The example process 300 can be performed, for example, to operate an amplifier circuit. For instance, operations in the example process 300 may be performed by operating respective circuit components in the example amplifier circuit 200 shown in FIG. 2 or another amplifier circuit. The example process 300 may include additional or different operations, including operations performed by additional or different components, and the operations may be performed in the order shown in FIG. 3, or in another order. In some cases, operations in the example process 300 can be combined, iterated or otherwise repeated or performed in another manner during a magnetic resonance measurement.

In some cases, operations in the example process 300 shown in FIG. 3 are implemented as processes to provide nanosecond switching between two different modes of operation in a magnetic resonance measurement, e.g., a pulsed mode and a continuous-wave mode; and to process respective magnetic resonance control signals under different modes before being delivered to a resonator device in a resonator circuit (e.g., the resonator device 404, 434, 604, 634 of the resonator circuit 400, 430, 600, 630 in FIGS. 4A-4B and 6A-6B).

At 302, signals are received. As shown in FIG. 3, the operation 302 includes two sub-operations 302A, 302B. During the sub-operation 302A, the magnetic resonance control signal is received at the input port 212A of the amplifier circuit 200, for example, from the spectrometer unit 104 of the magnetic resonance system 100 in FIG. 1. During sub-operation 302B, the digital control signals are received at the control ports 214A, 214B of the amplifier circuit 200, for example, from the signal processing unit 102 of the magnetic resonance system 100 in FIG. 1.

At 304, states of the circuit components are controlled based on the digital control signals. In some implementations, the states of the first and second switch devices 202, 206 in the amplifier circuit 200 are controlled based on the states of the digital control signals received. For example, when the magnetic resonance control signal received is for a pulsed magnetic resonance measurement and the digital control signal on the first switch device 202 is in a first state (e.g., the logic high level), the first switch device 202 of the example amplifier circuit 200 in FIG. 2 is in a first state. When the first switch device 202 is in the first state, the input port 212A is coupled with the first output port of the first switch device 202, which allows delivery of the magnetic resonance control signal from the input port 212A to the first output port of the first switch device 202 with no attenuation or negligible attenuation. Under the first state of the first switch device 202, the input port is also decoupled from the second output port of the first switch device 202. In some implementations, the digital control signal applied to the first switch device 202 is a single-bit digital control signal or another type of digital control signal. Further, when the magnetic resonance control signal is for a pulsed magnetic resonance measurement, the digital control signal on the second switch device 206 is in the first state (e.g., the logic high level) and the second switch device is in the first state. When the second switch device 206 is in the first state, the input port is coupled with the output port of the second switch device 206 with no attenuation or negligible attenuation. In some instances, the second switch device 206 may be switched to the second state for HPA blanking.

For another example, when the magnetic resonance control signal received at the amplifier circuit 200 is for a continuous-wave magnetic resonance measurement, the digital control signal received by the first switch device 202 at the control port 214A is in the second state (e.g., the logic low level); and the first switch device 202 is in the second state. When the first switch device 202 is in the second state, the input port 212A is coupled with the second output port of the first switch device 202, which allows delivery of the magnetic resonance control signal from the input port 212A to the second output port of the first switch device 202 with no attenuation or negligible attenuation. Under the second state of the first switch device 202, the input port may be also decoupled from the first output port of the first switch device 202. In some instances, when the magnetic resonance control signal is for a continuous-wave magnetic resonance measurement, the digital control signal received by the second switch device 206 at the control port 214B is in a second state (e.g., the logic low level). When the second switch device 206 is in the second state, the input port is decoupled from the output port of the second switch device 206.

At 306, the magnetic resonance control signal is processed based on the states of the circuit components of the amplifier circuit 200. The magnetic resonance control signal can be processed in two sub-routines, e.g., a first sub-routine 320 which includes operations 310, 312, 314 for processing the magnetic resonance control signal for a pulsed magnetic resonance measurement and a second sub-routine 322 which includes operation 316 for a continuous-wave magnetic resonance measurement.

At 310, the first and second switch devices 202, 206 are in the first states; and the magnetic resonance control signal is passed to the HPA device 204. In particular, the magnetic resonance control signal is passed from the input port of the first switch device 202 to the first output port of the first switch device 202, which is coupled to the HPA input port of the HPA device 204. The HPA device 204 is configured to amplify the magnetic resonance control signal. The first sub-routine 320 continues with operation 312, during which the magnetic resonance control signal is amplified by the HPA device 204; and operation 314, during which the amplified magnetic resonance control signal is passed to the power combiner device 210. The second sub-routine 322 includes operation 316, during which the first and second switch devices 202, 206 are in the second states; and the magnetic resonance control signal is directly passed to the power combiner device 210 from the first switch device 202, bypassing the HPA device 204.

At 308, an output of the power combiner device 210 is passed to a resonator circuit of the magnetic resonance system (e.g., in the resonator unit 108 of the magnetic resonance system 100, the resonator circuit 400, 430, 600, 630 in FIGS. 1, 4A, 4B, 6A-6B).

In some cases, operations 302, 304, 306, 308 in the example process 300 are executed as an iterative process, where each iteration includes receiving a magnetic resonance control signal and digital control signals; controlling the states of the circuit components based on the digital control signals; processing the magnetic resonance control signal based on the states of the circuit components; and delivering the magnetic resonance control signal from the power combiner device to the resonator circuit where the resonator device resides. Each iteration of the iterative process may include additional operations. During each iteration, different sub-routines 320, 322 can be selected based on the states of the circuit components and used for processing the magnetic resonance control signal according to the mode of operation of the magnetic resonance measurement to be performed. Operations 302, 304, 306, 308 may be repeated arbitrarily and in any order during the same magnetic resonance experiment or several magnetic resonance experiments.

In some instances, the first and second sub-routines 320, 322 may include additional operations. For example, when the amplifier circuit 200 includes the bandpass filter device 208, which may reside at various locations within the amplifier circuit 200, the first sub-routine 320 may include operating the bandpass filter device 208 to filter the first magnetic resonance control signal. For example, prior to passing the amplified first magnetic resonance control signal to the power combiner device 210, the amplified first magnetic resonance control signal may be passed through the bandpass filter device 208. When the bandpass filter device 208 is coupled between the power combiner device 210 and the output port 212B, the example process 300 may include an operation after the operation 308 during which the output of the power combiner device 210 is filtered by operation of the bandpass filter device 208.

Figure 4A:
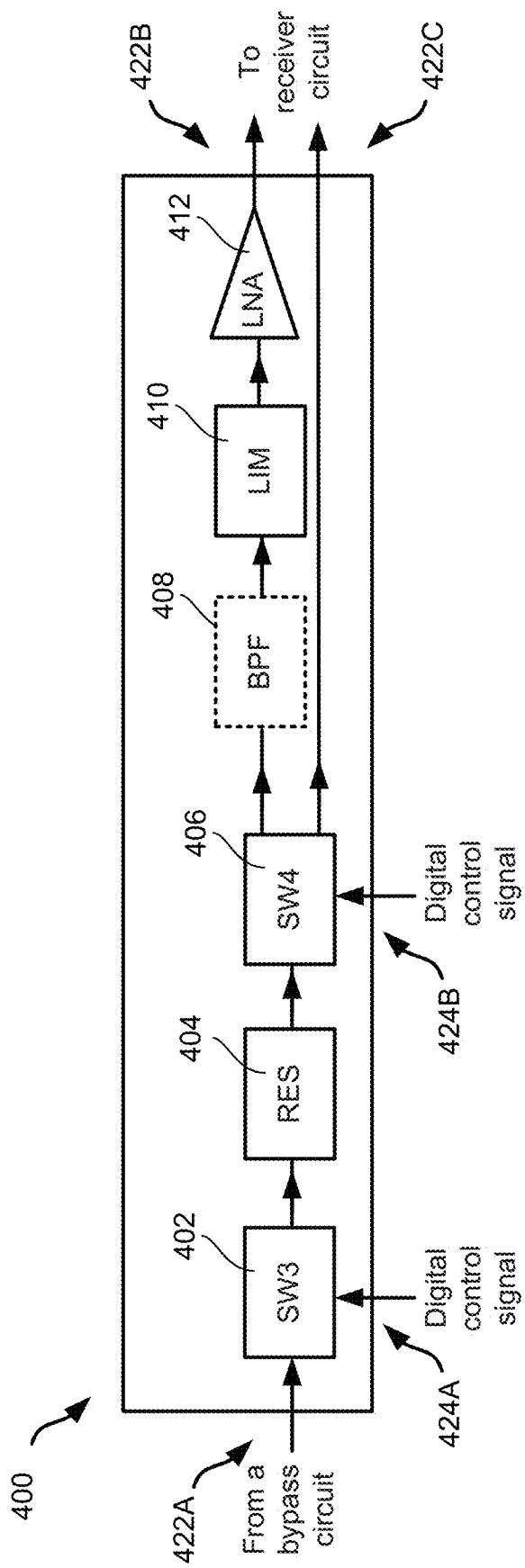
FIG. 4A is a schematic diagram showing aspects of an example resonator circuit.

FIG. 4A is a schematic diagram showing aspects of an example resonator circuit 400 of a magnetic resonance system. In some implementations, the example resonator circuit 400 is deployed as part of a magnetic resonance system, e.g., in the resonator unit 108 of the example magnetic resonance system 100 in FIG. 1. In some implementations, the example resonator circuit 400 provides an integration of a cryogenic low-noise amplifier device with a resonator device and is configured to perform nanoscale switching between a normal mode of operation in a magnetic resonance measurement (e.g., pulsed/continuous-wave mode) and pulse transient digitization/correction mode. In some implementations, the example resonator circuit 400 allows sequential acquisitions of pulse transient fields and spin signals in the same experiment.

As shown in FIG. 4A, the example resonator circuit 400 includes a first switch device 402, a resonator device 404, a second switch device 406, a bandpass filter device 408, a limiter device 410 and a low-noise amplifier (LNA) device 412. As shown in FIG. 4A, the example resonator device 404 is a two-port device that includes an input port, an output port, and a resonator configured between the input and output ports. The resonator is configured to operate in transmission mode, e.g., receiving a signal from the input port and producing an output a signal from the output port. The first switch device 402 includes an input port, an output port, and a control port. The second switch device 406 includes an input port, a first output port, a second output port, and a control port. The input port of the first switch device 402 receives a magnetic resonance control signal from an amplifier circuit (e.g., the example amplifier circuit 200 in FIG. 2 or in another manner) at a first port 422A. The input port of the resonator device 404 is coupled to the output port of the first switch device 402. The input port of the second switch device 406 is coupled to the output port of the resonator device 404. The resonator circuit 400 further includes a first control port 424A and a second control port 424B. The control port of the first switch device 402 is coupled with the first control port 424A of the resonator circuit 400; and the control port of the second switch device 406 is coupled with the second control port 424B of the resonator circuit 400. In some instances, the first switch device 402 may be omitted.

In the example resonator circuit 400, the bandpass filter device 408 and the limiter device 410 each include respective input ports and output ports. As shown in FIG. 4A, the input port of the bandpass filter device 408 is coupled to the first output port of the second switch device 406. The input port of the limiter device 410 is coupled to the output port of the bandpass filter device 408. The LNA device 412 includes an LNA input port and an LNA output port. The LNA input port is coupled to the output port of the limiter device 410. The LNA output port is further coupled to a receiver circuit of the magnetic resonance system at a second port 422B. The second output port of the second switch device 406 is coupled to the receiver circuit of the magnetic resonance system at a third port 422C.

In certain instances, the first output port of the second switch device 406 may be directly coupled to the input port of the limiter device 410 without going through the bandpass filter device 408 (e.g., the bandpass filter device 408 may be omitted). In certain instances, the bandpass filter device 408 may be coupled to the rest of the components of the resonator circuit 400 in a different manner. For example, the input port of the bandpass filter device 408 can be coupled to the output port of the resonator device 404 and the output port of the bandpass filter device 408 can be coupled to the input port of the second switch device 406. In this case, the first output port of the second switch device 406 may be directly coupled to the input port of the limiter device 410. In some implementations, the bandpass filter device 408 may be implemented as the bandpass filter device 208 in FIG. 2 or in another manner.

In FIG. 4A, input and output ports of the circuit components of the example resonator circuit 400 are indicated by arrows on signal connections between circuit components. In some instances, the signal connections between the circuit components of the resonator circuit 400 include waveguides, co-axial cables, metal wires or feedlines, or another type of signal lines. In some instances, the example resonator circuit 400 resides within a cryogenic environment at a cryogenic temperature where the resonator resides. In some instances, at least a portion of the resonator circuit 400 resides in an environment different from the resonator device 404. For example, the first and second switch devices 402, 406 and the LNA device 412 may reside outside a cryostat where the resonator device 404 resides, for example at room temperature. In some examples, the example resonator circuit 400 may include additional or different components, and the components may be arranged as shown or in another manner.

In some implementations, a state of a first digital control signal at the first control port 424A determines a state of the first switch device 402. For example, when the first digital control signal is in a first state (e.g., at a logic high level), the first switch device 402 is in a first state. When the first switch device 402 is in the first state, the input port of the first switch device 402 is coupled with the output of the first switch device 402 allowing magnetic resonance control signals to be delivered from the input port to the output port of the first switch device 402. When the first digital control signal is in a second state (e.g., at a logic low level), the first switch device 402 is in a second state. When the first switch device 402 is in the second state, the input port of the first switch device 402 is decoupled from the output of the first switch device 402 blocking the magnetic resonance control signal from being delivered to the output port of the first switch device 402. In some instances, signal noise, for example, from the amplifier circuit 200 residing at room temperature can be received at the first port 422A of the resonator circuit 400. The first switch device 402 is configured to isolate and block the signal noise and thermal noise from reaching the resonator device 404 and the rest of the magnetic resonance system during signal acquisition. In some implementations, the first switch device 402 is a single-pole, single-throw (SPST) switch device, or other types of switch devices that can be controlled by other types of digital control signals. In some implementations, the first switch device 402 may be implemented as the second switch device 206 of the amplifier circuit in FIG. 2 or in another manner.

In some implementations, a state of a second digital control signal at the second control port 424B determines a state of the second switch device 406. For example, when the second digital control signal is in a first state (e.g., at a logic high level), the second switch device 406 is in a first state. When the second switch device 406 is in the first state, the input port of the second switch device 406 is coupled with the first output port of the second switch device 406 allowing a magnetic resonance detection signal received from the output port of the resonator device 404 to be delivered from the input port to the first output port of the second switch device 406. At the same time, the input port is decoupled from the second output port of the second switch device 406, for example, when the attenuation value between signal levels at the input port and the second output port is greater than 60 dB Under the first state of the second switch device 406, a magnetic resonance detection signal from the resonator device 404 can be passed to the receiver circuit of the magnetic resonance system and used for a continuous-wave or pulsed magnetic resonance measurement.

When the second digital control signal is in a second state (e.g., at a logic low level), the second switch device 406 is in a second state. When the second switch device 406 is in the second state, the input port of the second switch device 406 is coupled with the second output port of the second switch device 406 allowing a magnetic resonance detection signal received from the output port of the resonator device 404 being delivered to the second output port of the second switch device 406. At the same time, the input port is decoupled from the first output port of the second switch device 406. Under the second state of the second switch device 406, the magnetic resonance detection signal from the resonator device 404 can be passed to the receiver circuit of the magnetic resonance system on a path that bypasses the LNA device 412; and the magnetic resonance detection signal can be used for digitizing pulse transients and further used for correcting or tuning the magnetic resonance control signal received at the first port 422A of the resonator circuit 400.

In some implementations, the second switch device 406 is a single-pole, double-throw (SPDT) switch device. In some instances, the second switch device 406 may be implemented as the first switch device 202 of the example amplifier circuit 200 in FIG. 2 or in another manner. In some implementations, the first and second switch devices 402, 406 are cryogenic switch devices. In some instances, the output at the third port 422C of the resonator circuit 400 can be attenuated prior to being further processed by the receiver unit 110 of the magnetic resonance system 100 in FIG. 1. In some instances, the first and second states of the second switch device 406 may be switched during a single experiment in a controlled fashion for an arbitrary number of times. In some implementations, the second switch device 406 is configured to protect the LNA device 412 from high-power pulses (receiver blanking) and provide bypassing of the LNA device 412 for pulse transient digitizing. In some instances, the first and second switch devices 402, 406 may be operated according to the control sequences shown in FIGS. 8A-8B.

In some implementations, when a continuous-wave magnetic resonance measurement is performed, the first and second digital control signals received at the first and second switch devices 402, 406 are in the first states during the same time period ($t_1-t_0$) as shown in FIG. 8A; and when a pulsed magnetic resonance measurement is performed, the first switch device 402 is in the first state during a first time period ($t_1-t_0$) and in the second state during a second time period ($t_4-t_1$); and the second switch device 406 is in the first state during a third time period ($t_{acq}=t_3-t_2$). In some implementations, the third time period $t_{acq}$ is separated from the first time period by a dead time ($t_{dead}=t_2-t_1$) and $t_3<t_4$, as shown in FIG. 8B. During the first time period ($t_1-t_0$), since the ADC signal remains at a logical high level, the magnetic resonance detection signal received during the first time period is collected by the receiver circuit of the magnetic resonance system (e.g., to the receiver unit 110 of the magnetic resonance system 100 and further to the ADC device 128 of the signal processing unit 102 of the magnetic resonance system 100) and used for digitizing and correcting pulse transients.

In some examples, the resonator device 404 may be fabricated on the surface of a resonator chip. The resonator device 404 may include one or more planar microstrip resonators or one or more coplanar waveguide resonators made of a material that is superconducting when operating in a cryogenic environment. In some instances, the one or more planar microstrip resonators or one or more coplanar waveguide resonators of the resonator device 404 may include tunable gaps, capacitively coupled microstrip/coplanar waveguide feedlines, which can be made from superconducting material, normal conducting material, or superconducting material plated with a normal conducting material. In some implementations, the resonator device 404 is compatible with standard hardware for conversion of coaxial mode transmission lines in probe to microstrip transmission lines or coplanar waveguide transmission lines on the surface of the resonator chip.

For example, the resonator device 404 may include a planar single microstrip niobium (Nb) resonator with a maximum quality factor of greater than 10,000, e.g., Q>10,000 and a mode volume of less than 0.001 cubic millimeter (<0.001 mm$^3$), which results in an absolute spin number sensitivity for sample size of less than 100 nanoliter (nL) (<100 nL) or another range. For example, the resonator device 404 may include a planar single microstrip Nb resonator with a maximum quality factor of greater than 1000 and less than 10,000, e.g., 10,000>Q>1000, and a mode volume of greater than 0.001 cubic millimeter (>0.001 mm$^3$), which results in an absolute spin number sensitivity for sample sizes in a range of 100 nL and 1 microliter (μL), e.g., 100 nL~100 μL. For another example, the planar single microstrip resonator may be made of yttrium barium copper oxide (YBCO) or another high-temperature superconducting material (e.g., 4 K-80 K). In this case, the resonator device 404 is configured to handle higher power (e.g., >1 W or another range), leading to a higher signal-to-noise ratio (SNR) provided by faster signal averaging (shorter T1) and larger Rabi fields (e.g., >100 MHz or another range).

The example limiter device 410 is configured to protect the LNA device 412. For example, the limiter device 410 may be configured to allow signals below a specified power level to pass, while attenuating or blocking signals above the specified power level. In some instances, a threshold value of the specified power level is chosen according to the specification of the LNA device 412 to prevent damage to the LNA device 412. In some instances, the limiter device 410 may be coupled to the rest of the components of the resonator circuit 400 in a different manner. For example, the input port of the limiter device 410 can be coupled to the output port of the resonator device 404 and the output port of the limiter device 410 can be coupled to the input port of the second switch device 406. In this case, the first output port of the second switch device 406 may be directly coupled to the LNA input port of the LNA device 412.

In some implementations, the LNA device 412 is a cryogenic LNA device operating in a cryogenic environment. In some instances, the LNA device 412 may be operated in another environment, for example, with an elevated temperature or room temperature. The LNA device 412 can receive and amplify a magnetic resonance detection signal from the first output port of the second switch device 406.

Figure 4B:
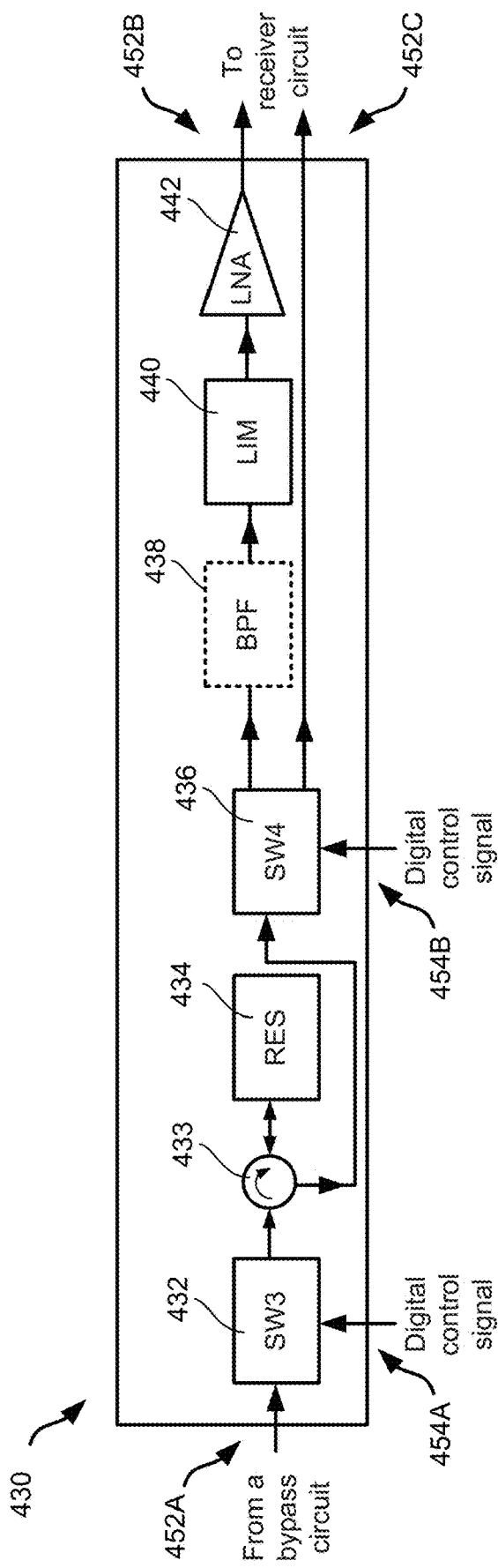
FIG. 4B is a schematic diagram showing aspects of an example resonator circuit.

FIG. 4B is a schematic diagram showing aspects of an example resonator circuit 430 of a magnetic resonance system. In some implementations, the example resonator circuit 430 is deployed as part of a magnetic resonance system, e.g., in the resonator unit 108 of the example magnetic resonance system 100 in FIG. 1. In some implementations, the example resonator circuit 430 provides an integration of a cryogenic low-noise amplifier device with a resonator device and is configured for nanoscale switching between a normal mode of operation in a magnetic resonance measurement (e.g., pulsed/continuous-wave mode) and pulse transient digitization/correction mode. In some implementations, the example resonator circuit 430 allows sequential acquisitions of pulse transient fields and spin signals in the same experiment.

As shown in FIG. 4B, the example resonator circuit 430 includes a first switch device 432, a circulator device 433, a resonator device 434, and a second switch device 436. The resonator device 434 is a single-port resonator device including an input/output port and is configured to operate in reflection mode, e.g., receiving an input signal at the input/output port and providing an output signal via the same input/output port.

As shown in FIG. 4B, the example resonator circuit 430 further includes a bandpass filter device 438, a limiter device 440, and a LNA device 442. Each of the bandpass filter device 438, the limiter device 440 and the LNA device 442 includes an input port and an output port. The first switch device 432 includes an input port, an output port, and a first control port. The circulator device 433 includes an input port, an input/output port, and an output port. In some instances, the circulator device 433 may be implemented as a single electrically controlled circulator device, a series of circulator devices which are connected to one another with at least one circulator device that can be digitally controlled, a digitally controlled directional coupler device, or another type of device. The input port of the first switch device 432 receives a magnetic resonance control signal from an amplifier circuit (e.g., the example amplifier circuit 200 in FIG. 2 or in another manner) via a first port 452A. The output port of the first switch device 432 is coupled to the input port of the circulator device 433. The input/output port of the resonator device 434 is coupled to the input/output port of the circulator device. The second switch device 436 includes an input port, a first output port, a second output port, and a second control port. The input port of the second switch device 436 is coupled to the output port of the circulator device 433. The input port of the bandpass filter device 438 is coupled to the first output port of the second switch device 436. The input port of the limiter device 440 is coupled to the output port of the bandpass filter device 438. The LNA device 442 includes an LNA input port and an LNA output port. The LNA input port is coupled to the output port of the limiter device 440. The LNA output port is further coupled to the receiver circuit of the magnetic resonance system at a second port 452B. The second output port of the second switch device 436 is coupled to the receiver circuit of the magnetic resonance system at a third port 452C. The resonator circuit 430 includes a first control port 454A coupled to the control port of the first switch device 432, and a second control port 454B coupled to the control port of the second switch device 436.

In certain instances, the bandpass filter device 438 is omitted from the resonator circuit 430. In some other instances, the bandpass filter device 438 may be coupled to other components of the resonator circuit 430 in a different manner. For example, the input port of the bandpass filter device 438 can be coupled to the output port of the first switch device 432 and the output port of the bandpass filter device 438 can be coupled to the input port of the second switch device 436. In this case, the first output port of the second switch device 436 may be directly coupled to the input port of the limiter device 440. In some implementations, the bandpass filter device 438 may be implemented as the bandpass filter device 208 in FIG. 2 or in another manner.

In some implementations, the first switch device 432, the second switch device 436, the bandpass filter device 438, the limiter device 440, and the LNA device 442 may be implemented as the respective devices in FIG. 4A or in another manner. In some implementations, input, output, and input/output ports of the circuit components of the example resonator circuit 430 are coupled to one another through waveguides, co-axial cables, metal wires or feedlines, or another type of signal lines. In some instances, the first and second switch devices 432, 436, the bandpass filter device 438, the limiter device 440, and the LNA device 442 of the example resonator circuit 430 may reside within the cryogenic environment where the resonator device 434 resides or at an elevated cryogenic temperature, or room temperature. In some examples, the example resonator circuit 430 may include additional or different components, and the components may be arranged as shown or in another manner.

In some implementations, a state of a first digital control signal at the first control port 454A determines a state of the first switch device 432. For example, when the first digital control signal is in a first state (e.g., at a logic high level), the first switch device 432 is in a first state. When the first switch device 432 is in the first state, the input port of the first switch device 432 is coupled with the output port of the first switch device 432 allowing the magnetic resonance control signal being delivered from the input port 452A to the output port of the first switch device 432.

When the first digital control signal at the first control port 454A is in a second state (e.g., at a logic low level), the first switch device 432 is in a second state. When the first switch device 432 is in the second state, the output port of the first switch device 432 is decoupled from the input port of the first switch device 432 preventing the magnetic resonance detection signal from the resonator device 434 being delivered to the input port of the first switch device 432; and blocking the magnetic resonance control signal or other noise signal from being delivered to the resonator device 434.

In some implementations, the switch time of the first switch device 432 is equal to or less than 20 ns, equal to or less than 30 ns, or in another range. In some instances, signal noise, from the amplifier circuit 200 residing at room temperature, can be received at the first port 452A of the resonator circuit 430. The first switch device 432 is configured to isolate and block the signal noise from reaching the resonator device 434 and the rest of the magnetic resonance system during signal acquisition.

In some implementations, the input port of the circulator device 433 is coupled with the input/output port of the circulator device 433 and remains decoupled or isolated from the output port of the circulator device 433; and the output port of the circulator device 433 is coupled to the input/output port of the circulator device 433 and remains decoupled or isolated from the input port of the circulator device 433. In some implementations, the circulator device 433 allows the magnetic resonance control signal to be delivered from the first switch device 432 to the resonator device 434; and allows the magnetic resonance detection signal to be delivered from the resonator device 434 to the second switch device 436.

In some implementations, a state of a second digital control signal at the second control port 454B determines a state of the second switch device 436. For example, when the second digital control signal is in a first state (e.g., at a logic high level), the second switch device 436 is in a first state. When the second switch device 436 is in the first state, the input port of the second switch device 436 is coupled with the first output port of the second switch device 436 allowing a signal received from the output port of the circulator device 433 to be delivered via the first output port of the second switch device 436 to the LNA device 442; and the input port is decoupled from the second output port of the second switch device 436. Under the first state of the second switch device 436, the signal is used for a continuous-wave or pulsed magnetic resonance measurement.

When the second digital control signal is in a second state (e.g., at a logic low level), the second switch device 436 is in a second state. When the second switch device 436 is in the second state, the input port of the second switch device 436 is coupled with the second output port of the second switch device 436 allowing the magnetic resonance detection signal received from the output port of the circulator device 433 to be delivered to the second output port of the second switch device 436; and the input port is decoupled from the first output port of the second switch device 436. Under the second state of the second switch device 436, the magnetic resonance detection signal received from the output port of the first switch device 432 is passed via the second output port of the second switch device 436 to a path that bypasses the bandpass filter device 438, the limiter device 440, and the LNA device 442; and the magnetic resonance detection signal is collected by the receiver unit 110 and further by the ADC device 128 of the magnetic resonance system 100. In some implementations, the magnetic resonance detection signal is used for digitizing pulse transients. The digitalized pulse transient can be analyzed by a computer system and further used to correct the magnetic resonance control signal generated by the signal processing unit 102.

In some implementations, when a continuous-wave magnetic resonance measurement is performed, the first and second switch devices 432, 436 are in the first states during the same time period ($t_1 - t_0$) as defined by the control sequences shown in FIG. 8A; and when a pulsed magnetic resonance measurement is performed, the first switch device 402 is in the first state during a first time period ($t_1 - t_0$) and in the second state during a second time period ($t_4 - t_1$); and the second switch device 406 is in the first state during a third time period ($t_{acq} = t_3 - t_2$) and is in the second state during a fourth time period ($t_1 - t_0$ and $t_4 - t_3$). In some implementations, the third time period $t_{acq}$ is separated from the first time period by a dead time ($t_{dead} = t_2 - t_1$) and $t_3 < t_4$, as defined by the control sequences shown in FIG. 8B. During the first time period ($t_1 - t_0$), the magnetic resonance measurement is in digitization/correction mode.

In some implementations, the second switch device 436 is a single-pole, double-throw (SPDT) switch. In some instances, the signal output at the third port 452C of the resonator circuit 430 can be attenuated prior to being further processed by the receiving circuit of the magnetic resonance system. In some instances, the first and second states of the second switch device 436 may be switched during a single experiment in a controlled fashion for an arbitrary number of times. In some implementations, the second switch device 436 is configured to protect the LNA device 442 from high-power pulses (receiver blanking) and provide bypass of the LNA device 442 for pulse transient digitizing, where signal could potentially damage the LNA device 442. In some implementations, the second switch device 436 may be implemented as the switch device 406 of the resonator circuit 400 in FIG. 4A or other types of switch devices that may be controlled by other types of digital control signals (e.g., one-bit, two-bit, or multi-bit digital control signals).

Figure 5:
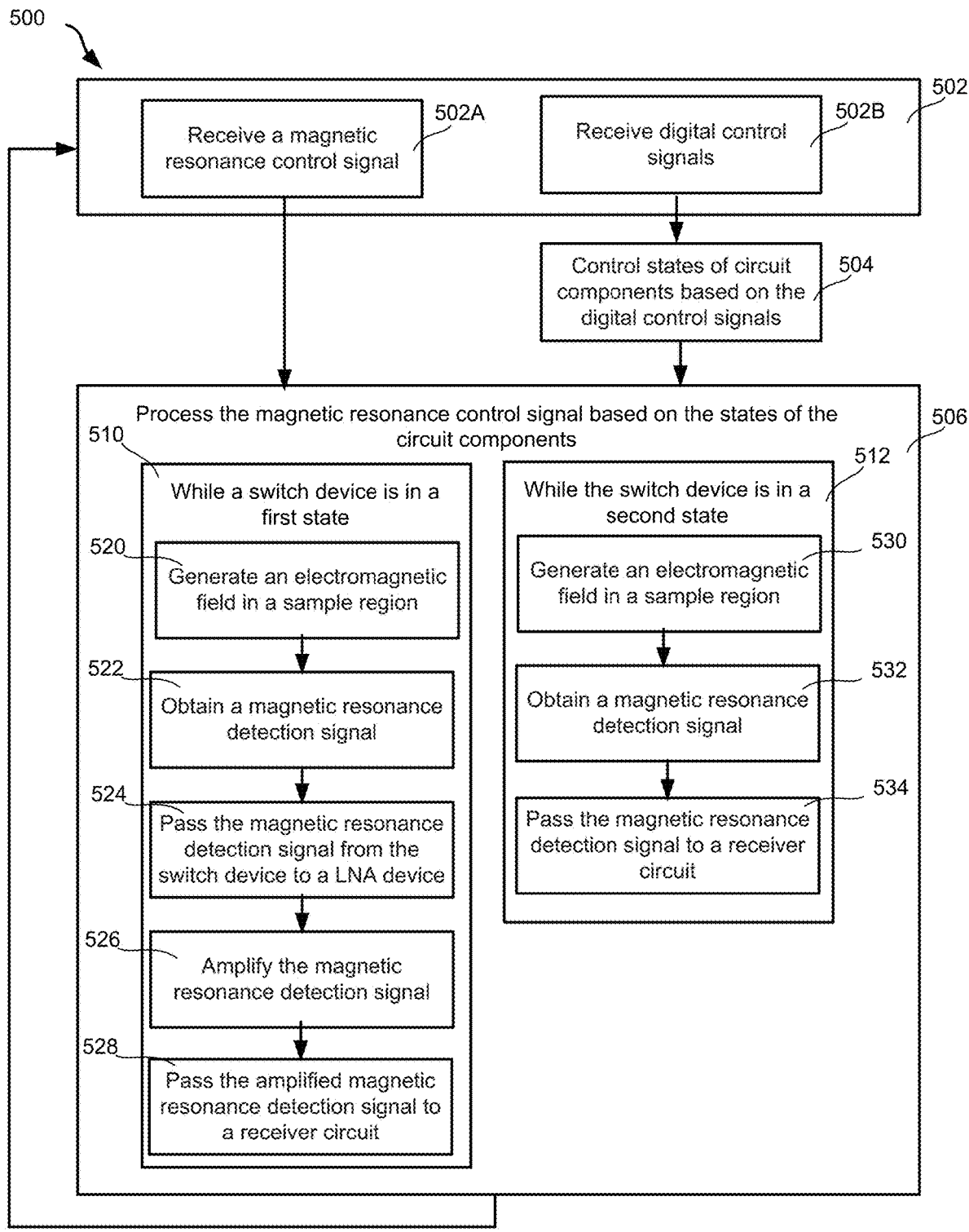
FIG. 5 is a flow diagram showing aspects of an example process for operating the example resonator circuits shown in FIGS. 4A-4B.

FIG. 5 is a flow diagram showing aspects of an example process 500. In some cases, the operations in the example process 500 shown in FIG. 5 are used to switch between a normal mode of operation in a magnetic resonance measurement (e.g., continuous-wave or pulsed mode) and a digitization/correction mode with a nanosecond switching time. The example process 500 can be performed, for example, by operation of a resonator circuit. For instance, operations in the example process 500 may be performed by the example resonator circuits 400, 430 shown in FIG. 4A-4B or another type of circuit. The example process 500 may include additional or different operations, including operations performed by additional or different components, and the operations may be performed in the order shown or in another order. In some cases, operations in the example process 500 can be combined, iterated, or otherwise repeated or performed in another manner during a magnetic resonance measurement.

At 502, signals are received. As shown in FIG. 5, the operation 502 includes two sub-operations 502A, 502B. During the sub-operation 502A, the magnetic resonance control signal is received at the input port 422A, 452A of the resonator circuit 400, 430, for example, from the bypass unit 106 of the magnetic resonance system 100 in FIG. 1. During sub-operation 502B, the digital control signals are received at the control ports 424A, 424B, 454A, 454B of the resonator circuits 400, 430, for example, from the signal processing unit 102 of the magnetic resonance system 100 in FIG. 1. In some implementations, the magnetic resonance control signal may be generated by the signal processing unit 102 and the spectrometer unit 104 of the magnetic resonance system 100 in FIG. 1 or in another manner.

At 504, states of the circuit components are controlled based on the digital control signals. In some implementations, the states of the first and second switch devices 402, 406 in the resonator circuit 400 or the states of the first and second switch devices 432, 436 in the resonator circuit 430 are controlled based on the states of the digital control signals received. For example, when the digital control signal received by the first switch device 402, 432 at the control port 424A, 454A is in a first state (e.g., the logic high level), the first switch device 402, 432 is in a first state. When the first switch device 402 is in the first state, the first port 422A is coupled to the output port of the first switch device 402, which allows delivery of the magnetic resonance control signal from the first port 422A to the output port of the first switch device 402 with no attenuation or negligible attenuation. When the digital control signal received by the first switch device 402 at the control port 424A is in a second state (e.g., the logic low level), the first switch device 402 is in a second state where the input port is decoupled from the output port of the first switch device 402. When the digital control signal received by the first switch device 432 at the control port 454A is in a first state (e.g., the logic high level), the first switch device 432 is in the first state; and the input port 452A is coupled to the input/output port of the circulator device 433, which allows delivery of the magnetic resonance control signal from the input port 452A to the input/output port of the circulator device 433 with no attenuation or negligible attenuation. In some implementations, the digital control signal applied to the first switch device 402, 432 is a single-bit digital control signal or another type of digital control signal.

In some implementations, when the digital control signal received by the second switch device 406, 436 at the control port 424B, 454B is in a first state (e.g., the logic high level), the second switch device 406, 436 of the example resonator circuit 400, 430 in FIGS. 4A, 4B is in a first state. When the second switch device 406, 436 is in the first state, the input port of the second switch device 406, 436 is coupled to the first output port of the second switch device 406, 436, which allows delivery of the magnetic resonance detection signal from the input port to the first output port of the second switch device 406, 436 with no attenuation or negligible attenuation. Under the first state of the second switch device 406, 436, the input port is also decoupled from the second output port of the second switch device 406, 436. In some implementations, when the digital control signal received by the second switch device 406, 436 at the control port 424B, 454B is in a second state (e.g., the logic low level), the second switch device 406, 436 is in a second state. When the second switch device 406, 436 is in the second state, the input port of the second switch device 406, 436 is coupled to the second output port of the second switch device 406, 436, which allows delivery of the magnetic resonance detection signal from the input port to the second output port of the second switch device 406, 436 with no attenuation or negligible attenuation. Under the first state of the second switch device 406, 436, the input port is decoupled from the first output port of the second switch device 406, 436.

At 506, the magnetic resonance control signal is processed based on the states of the circuit components of the resonator circuit 400, 430. The magnetic resonance control signal can be processed in two sub-routines, e.g., a first sub-routine 510 which includes operations 520, 522, 524, 526, 528 for performing a magnetic resonance measurement; and a second sub-routine 512 which includes operations 530, 532 for digitizing pulse transients and further for correcting or tuning the magnetic resonance control signal.

At 520 of the first sub-routine 510, an electromagnetic field is generated in a sample region of the resonator device 404, 434. In some instances, when the first switch device 402, 432 is in the first state, the magnetic resonance control signal is received at the resonator device 404, 434 from the first port 422A, 452A of the resonator circuit 400, 430 through the first switch device 402, 432. In some instances, when a magnetic resonance control signal is received at the resonator device 404, 434, an electromagnetic field is generated in the sample region of the magnetic resonance system according to the magnetic resonance control signal and configurations/characteristics of the resonator device 404, 434.

At 522 of the first sub-routine 510, a magnetic resonance detection signal is obtained. When the resonator device is a two-port resonator device (e.g., the resonator device 404 in FIG. 4A) configured to operate in transmission mode and while the first switch device 402 is in the first state, the magnetic resonance control signal is passed to the input port of the resonator device 404; and the magnetic resonance detection signal is obtained at the output port of the resonator device 404 and further passed to the input port of the second switch device 406.

When the resonator device is a single-port resonator device (e.g., the resonator device 434 in FIG. 4B) having an input/output port and configured to operate in reflection mode and while the first switch device 432 is in the first state, the magnetic resonance control signal is passed to the input/output port of the circulator device 433; and the magnetic resonance detection signal is obtained from the output port of the circulator device 433 and further passed to the input port of the second switch device 436.

At 524 of the first sub-routine 510, when the second switch device 406, 436 is in the first state, the magnetic resonance detection signal received at the input port of the second switch device 406, 436 is passed to the first output port of the second switch device 406, 436 and further to the LNA device 412, 442 of the resonator circuit 400, 430. In some instances, passing the magnetic resonance detection signal from the second switch device 406, 436 to the LNA device 412, 442, may include additional operations, e.g., passing the magnetic resonance detection signal from the second switch device 406, 436 to the LNA device 412, 442 through a bandpass filter device 408, 438 and/or a limiter device 410, 440.

The first sub-routine 510 continues with operation 526 during which the magnetic resonance detection signal is amplified by the LNA device 412, 442; and operation 528, during which the amplified magnetic resonance detection signal is passed to the receiver unit 110b of the magnetic resonance system 100 for a continuous-wave or pulsed magnetic resonance measurement. In certain instances, the first sub-routine 510 may include other operations and the operations of the first sub-routine 510 may be reordered according to the location of the bandpass filter device and the limiter device in the resonator circuit relative to other circuit components of the resonator circuit.

At 530 of the second sub-routine 512, an electromagnetic field is generated in a sample region of the resonator device 404, 434. In some instances, when the first switch device 402, 432 is in the first state, the magnetic resonance control signal is received at the resonator device 404, 434 from the first port 422A, 452A of the resonator circuit 400, 430 through the first switch device 402, 432. In some instances, when a magnetic resonance control signal is received at the resonator device 404, 434, an electromagnetic field is generated in the sample region of the magnetic resonance system according to the magnetic resonance control signal and configurations/characteristics of the resonator device 404, 434.

At 532 of the second sub-routine 512, a magnetic resonance detection signal is obtained. When the resonator device is a two-port resonator device (e.g., the resonator device 404 in FIG. 4A) configured to operate in transmission mode and while the first switch device 402 is in the first state, the magnetic resonance control signal is passed to the input port of the resonator device 404; and the magnetic resonance detection signal is obtained at the output port of the resonator device 404 and further passed to the input port of the second switch device 406.

When the resonator device is a single-port resonator device (e.g., the resonator device 434 in FIG. 4B) having an input/output port and configured to operate in reflection mode and while the first switch device 432 is in the first state, the magnetic resonance control signal is passed to the input/output port of the circulator device 433; and the magnetic resonance detection signal is obtained from the output port of the circulator device 433 and further passed to the input port of the second switch device 436.

At 534 of the second sub-routine 512, while the second switch device 406, 436 is in the second state, the magnetic resonance detection signal is passed from the second switch device 406, 436 to the receiver unit of the magnetic resonance system (e.g., the receiver unit 110 of the magnetic resonance system 100 as shown in FIG. 1). The magnetic resonance detection signal is used for digitizing pulse transients. Results from the digitization process can be used for correcting the magnetic resonance control signal for subsequent magnetic resonance measurements.

In some cases, operations 502, 504, 506 (and possibly other operations) are executed as an iterative process, where each iteration includes receiving the magnetic resonance control signal and digital control signals; switching the states of the first switch devices 402, 432 and the second switch devices 406, 436 in the resonator circuit 400, 430 between the first and second states according to the digital control signals; generate the magnetic resonance detection signal according to the magnetic resonance control signal; and delivering the magnetic resonance detection signal to the receiver circuit of the magnetic resonance system. Each iteration of the iterative process may include additional operations. During each iteration, different sub-routines 510, 512 can be selected based on the states of the circuit components and used for performing pulsing/transient digitization or for performing spin signal acquisition during a continuous-wave or pulsed magnetic resonance measurement. Operations 502, 504, 506 may be repeated arbitrarily and in any order during the same magnetic resonance measurement.

Figure 6A:
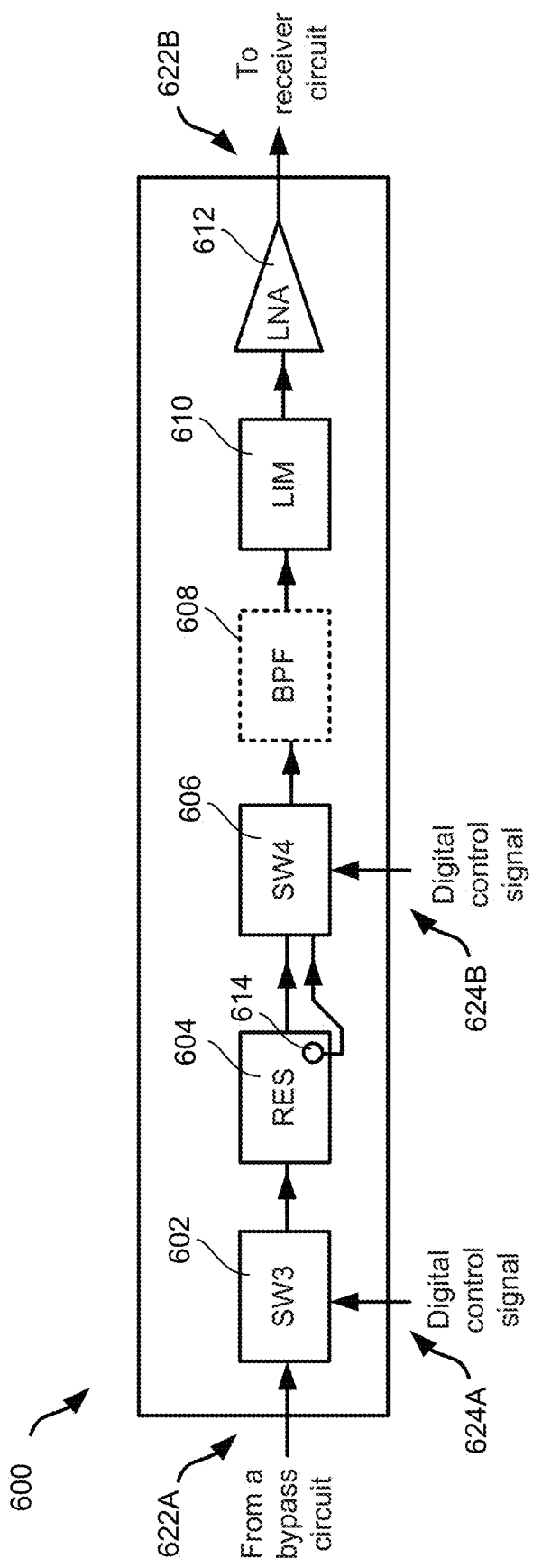
FIG. 6A is a schematic diagram showing aspects of an example resonator circuit.

FIG. 6A is a schematic diagram showing aspects of an example resonator circuit 600 of a magnetic resonance system. In some implementations, the example resonator circuit 600 is deployed as part of a magnetic resonance system, e.g., in the resonator unit 108 of the example magnetic resonance system 100 in FIG. 1. In some implementations, the example resonator circuit 600 provides an integration of a cryogenic low-noise amplifier device with a resonator device and is configured to switch between a normal mode of operation in a magnetic resonance measurement (e.g., pulsed/continuous-wave mode) and a pulse transient digitization mode in nanosecond time scales. In some implementations, the example resonator circuit 600 allows sequential acquisitions of pulse transient fields and spin signals in the same experiment.

As shown in FIG. 6A, the example resonator circuit 600 includes a first switch device 602, a resonator device 604, and a second switch device 606. The first switch device 602 includes an input port, an output port, and a control port. The second switch device 606 includes a first input port, a second input port, an output port, and a control port. The resonator circuit 600 includes a first control port 624A coupled to the control port of the first switch device 602, and a second control port 624B coupled to the control port of the second switch device 606. The input port of the first switch device 602 receives a magnetic resonance control signal from an amplifier circuit (e.g., the example amplifier circuit 200 in FIG. 2 or in another manner) at a first port 622A. The resonator device 604 has an input port and an output port; and is configured to operate in transmission mode. The input port of the resonator device 604 is coupled to the output port of the first switch device 602. The first input port of the second switch device 606 is coupled to the output port of the resonator device 604 for receiving a magnetic resonance detection signal. The first switch device 602, the resonator device 604, and the second switch device 606 are implemented as the respective circuit components of the resonator circuit 400 in FIG. 4A.

As shown in FIG. 6A, the resonator device 604 includes an electromagnetic field sensor device 614. The second input port of the second switch device 606 is coupled to the electromagnetic field sensor device 614 for receiving a sensor output signal. In some instances, the electromagnetic field sensor device 614 is weakly coupled to the resonator device 604 and is used to monitor the transient electromagnetic field applied to the spins in the sample region. In some implementations, the electromagnetic field sensor device 614 includes a coil device for detecting a magnetic field, a resistor device for detecting an electrical field, or another type of electromagnetic field sensor device.

In the example shown in FIG. 6A, the resonator circuit 600 further includes a bandpass filter device 608, a limiter device 610, and an LNA device 612. Each of the bandpass filter device 608, the limiter device 610 and the LNA device 612 includes an input port and an output port as indicated by arrows on signal connections between the circuit components shown in FIG. 6A. The input port of the bandpass filter device 608 is coupled to the output port of the second switch device 606. The input port of the limiter device 610 is coupled to the output port of the bandpass filter device 608. The LNA device 612 includes an LNA input port and an LNA output port. The LNA input port is coupled to the output port of the limiter device 610. The LNA output port is further coupled to the receiver unit 110 of the magnetic resonance system 100 at a second port 622B of the resonator circuit 600.

In certain instances, the bandpass filter device 608 the output port of the second switch device 606 may be directly coupled to the input port of the limiter device 610 without going through the bandpass filter device 608 (e.g., the bandpass filter device 608 may be omitted). In certain instances, the bandpass filter device 608 may be coupled to the other circuit components of the resonator circuit 600 in a different manner. For example, the input port of the bandpass filter device 608 can be coupled to the output port of the resonator device 604 and the output port of the bandpass filter device 608 can be coupled to the first input port of the second switch device 606. In this case, the output port of the second switch device 606 may be directly coupled to the input port of the limiter device 610.

In some implementations, input and output ports of the components of the example resonator circuit 600 may be connected to one another through waveguides, co-axial cables, metal wires or feedlines, or another type of signal lines. In some instances, the first and second switch devices 602, 606, the bandpass filter device 608, the limiter device 610 and the LNA device 612 of the example resonator circuit 600 resides in a cryogenic temperature with the resonator device 604. In some instances, at least a portion of the resonator circuit 600 resides in an environment different from the resonator device 604. For example, the first and second switch devices 602, 606 and the LNA device 612 may reside outside a cryostat where the resonator device 604 resides, for example at room temperature; or they may reside at an elevated cryogenic temperature. In some examples, the example resonator circuit 600 may include additional or different components, and the components may be arranged as shown or in another manner.

In some implementations, the first switch device 602, the resonator device 604, the second switch device 606, the bandpass filter device 608, the limiter device 610, and the LNA device 612 may be implemented as the respective devices of the example resonator circuit 400 in FIG. 4A, or in another manner.

In some implementations, a state of a second digital control signal at the second control port 624B determines a state of the second switch device 606. For example, when the second digital control signal is in a first state (e.g., at a logic high level), the second switch device 606 is in a first state. When the second switch device 606 is in the first state, the first input port is coupled with the output port of the second switch device 606 allowing a magnetic resonance detection signal received from the output port of the resonator device 604 being delivered to the output port of the second switch device 606; and the second input port is decoupled from the output port of the second switch device 606. Under the first state of the second switch device 606, the magnetic resonance detection signal is passed to the receiver unit 110 of the magnetic resonance system 100 and used for a continuous-wave or pulsed magnetic resonance measurement.

When the second digital control signal is in a second state (e.g., a logic low level), the second switch device 606 is in a second state. When the second switch device 606 is in the second state, the second input port is coupled with the output port of the second switch device 606 allowing a sensor output signal received from the magnetic field sensor device 614 of the resonator device 604 to be delivered from the second input port to the output port of the second switch device 606; and the first input port is decoupled from the output port of the second switch device 606. Under the second state of the second switch device 606, the sensor output signal is passed to the receiver unit 110 of the magnetic resonance system 100 and used for digitizing pulse transients and correcting the magnetic resonance control signal.

In some instances, the signal output at the second port 622B of the resonator circuit 600 can be attenuated prior to being further processed by the receiver circuit of the magnetic resonance system. In some instances, the first and second states of the second switch device 606 may be switched during a single experiment in a controlled fashion for an arbitrary number of times to switch between a normal mode of operation and the digitizing/correction mode.

Figure 6B:
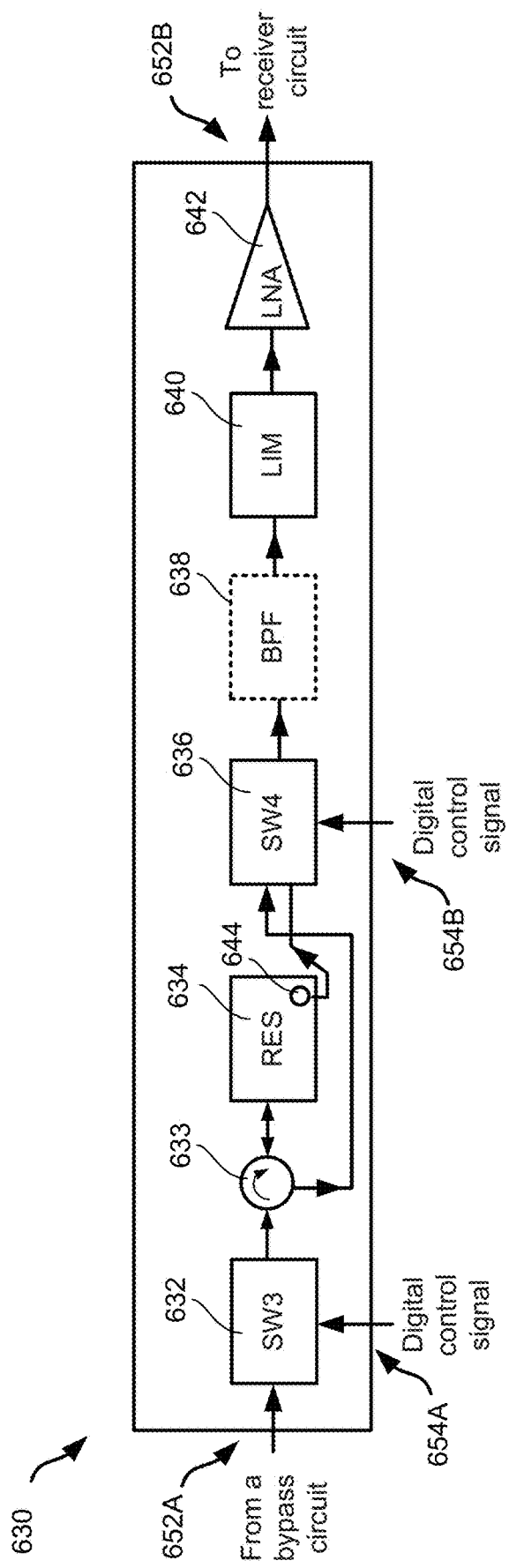
FIG. 6B is a schematic diagram showing aspects of an example resonator circuit.

FIG. 6B is a schematic diagram showing aspects of an example resonator circuit 630 of a magnetic resonance system. In some implementations, the example resonator circuit 630 is deployed as part of a magnetic resonance system, e.g., in the resonator unit 108 of the example magnetic resonance system 100 in FIG. 1. In some implementations, the example resonator circuit 630 provides an integration of a cryogenic low-noise amplifier device with a resonator device and is configured for switching between a normal mode of operation in a magnetic resonance measurement (e.g., pulsed/continuous-wave mode) and a pulse transient digitization mode in nanosecond time scales. In some implementations, the example resonator circuit 630 allows sequential acquisitions of pulse transient fields and spin signals in the same experiment.

As shown in FIG. 6B, the example resonator circuit 630 includes a first switch device 632, a circulator device 633, a resonator device 634, and a second switch device 636. The example resonator device 634 in FIG. 6B is a single-port resonator device. The resonator device 634 includes an input/output port and is configured to operate in reflection mode. The example resonator circuit 630 shown in FIG. 6B also includes a bandpass filter device 638, a limiter device 640, and an LNA device 642. Each of the bandpass filter device 638, the limiter device 640, and the LNA device 642 includes respective input ports and output ports as indicated by arrows on signal connections between the circuit components of the resonator circuit 630 in FIG. 6B. The first switch device 632 includes an input port, an output port, and a control port. The second switch device 636 includes a first input port, a second input port, an output port, and a control port.

The input port of the first switch device 632 receives a magnetic resonance control signal from an amplifier circuit (e.g., the example amplifier circuit 200 in FIG. 2 or in another manner) via a first port 652A of the resonator circuit 630. The input port of the circulator device 633 is coupled to the output port of the first switch device 632. The input/output port of the resonator device 634 is coupled to the input/output port of the circulator device 633. The first input port of the second switch device 636 is coupled to the output port of the circulator device 633. The resonator device 634 includes an electromagnetic field sensor device 644. In some instances, the electromagnetic field sensor device 644 is weakly coupled to the resonator device 634 and is used to monitor the transient magnetic field applied to the spins of a sample in the sample region of the magnetic resonance system. In some implementations, the electromagnetic field sensor device 644 includes a coil device for sensing a magnetic field, a resistor device for sensing an electrical field, or another type of electromagnetic field sensor device. In certain instances, the electromagnetic field sensor device 644 may be implemented as the electromagnetic field sensor device 614 in FIG. 6A, or in another manner. The second input port of the second switch device 636 is coupled to the electromagnetic field sensor device 644.

As shown in FIG. 6B, the input port of the bandpass filter device 638 is coupled to the output port of the second switch device 636. The input port of the limiter device 640 is coupled to the output port of the bandpass filter device 638. The LNA device 642 includes an LNA input port and an LNA output port. The LNA input port is coupled to the output port of the limiter device 640. The LNA output port is further coupled to a receiver unit 110 of the magnetic resonance system 100 at a second port 652B of the resonator circuit 630. The resonator circuit 630 further includes a first control port 654A coupled to the control port of the first switch device 632, and a second control port 654B coupled to the control port of the second switch device 636.

In certain instances, the bandpass filter device 638 may be omitted. For example, the output port of the second switch device 636 may be directly coupled to the input port of the limiter device 640 without going through the bandpass filter device 638. In certain instances, the bandpass filter device 638 may be coupled to other circuit components of the resonator circuit 630 in a different manner. For example, the input port of the bandpass filter device 638 can be coupled to the output port of the first switch device 632 and the output port of the bandpass filter device 638 can be coupled to the first input port of the second switch device 636. In this case, the output port of the second switch device 636 may be directly coupled to the input port of the limiter device 640.

In some implementations, input, input/output, output ports of the components of the example resonator circuit 630 are connected to one another through waveguides, co-axial cables, metal wires or feedlines, or another type of signal lines. In some instances, the first and second switch devices 632, 636, the bandpass filter device 638, the limiter device 640, and the LNA device 642 of the example resonator circuit 630 reside in a cryogenic environment or at room temperature. In some implementations, the first switch device 632, the resonator device 634, the second switch device 636, the bandpass filter device 638, the limiter device 640, and the LNA device 642 may be implemented as the respective devices of the example resonator circuit 430 in FIG. 4B or in another manner. In some examples, the example resonator circuit 630 may include additional or different components, and the components may be arranged as shown or in another manner.

In some implementations, a state of a first digital control signal at the first control port 654A determines a state of the first switch device 632. For example, when the first digital control signal is in a first state (e.g., at a logic high level), the first switch device 632 is in a first state. When the first switch device 632 is in the first state, the input port is coupled with the output port of the first switch device 632 allowing the magnetic resonance control signal to be delivered from the input port 652A to the output port of the first switch device 632. When the first digital control signal at the first control port 654A is in a second state (e.g., at a logic low level), the first switch device 632 is in a second state. When the first switch device 632 is in the second state, the input port is decoupled from the input/output port of the first switch device 632, blocking the magnetic resonance control signal from being delivered from the input port 652A to the output port of the first switch device 632.

In some implementations, the switch time of the first switch device 632 is equal to or less than 20 ns, equal to or less than 30 ns, or in another range. In some instances, signal noise, from the amplifier circuit 200 residing at room temperature, can be received at the first port 652A of the resonator circuit 630. The first switch device 632 is configured to isolate and block the signal noise from reaching the resonator device 634 and other components of the magnetic resonance system during signal acquisition.

In some implementations, the input port of the circulator device 633 is coupled with the input/output port of the circulator device 633 and remains decoupled or isolated from the output port of the circulator device 633; and the output port of the circulator device 633 is coupled to the input/output port of the circulator device 633 and remains decoupled or isolated from the input port of the circulator device 633. In some implementations, the circulator device 633 allows the magnetic resonance control signal to be delivered from the first switch device 632 to the resonator device 634; and allows the magnetic resonance detection signal to be delivered from the resonator device 634 to the second switch device 636.

In some implementations, a state of a second digital control signal at the second control port 654B determines a state of the second switch device 636. For example, when the second digital control signal is in a first state (e.g., at a logic high level), the second switch device 636 is in a first state. When the second switch device 636 is in the first state, the first input port is coupled with the output port of the second switch device 636 allowing a magnetic resonance detection signal received from the output port of the first switch device 632 to be delivered to the LNA device 642 via the output port of the second switch device 636; and the second input port is decoupled from the output port of the second switch device 636. Under the first state of the second switch device 1006, the magnetic resonance detection signal is used for a continuous-wave or pulsed magnetic resonance measurement.

When the second digital control signal is in a second state (e.g., at a logic low level), the second switch device 636 is in a second state. When the second switch device 636 is in the second state, the second input port is coupled with the output port of the second switch device 636 allowing the sensor output signal received from the electromagnetic field sensor device 644 of the resonator device 634 to be delivered from the second input port to the LNA device 642 via the output port of the second switch device 636; and the first input port is decoupled from the output port of the second switch device 636.

In some implementations, the second switch device 636 is a single-pole, double-throw (SPDT) switch device having two positions for delivering signals from the different input ports to the same output port of the second switch device 636. In some instances, the first and second switch devices 632, 636 may be other types of switch devices that can be controlled by other types of digital control signals. In some instances, the signal output at the second port 652B of the resonator circuit 630 can be attenuated prior to being further processed by the receiver unit 110 of the magnetic resonance system 100. In some instances, the first and second states of the second switch device 636 may be switched during a single experiment in a controlled fashion for an arbitrary number of times.

Figure 7:
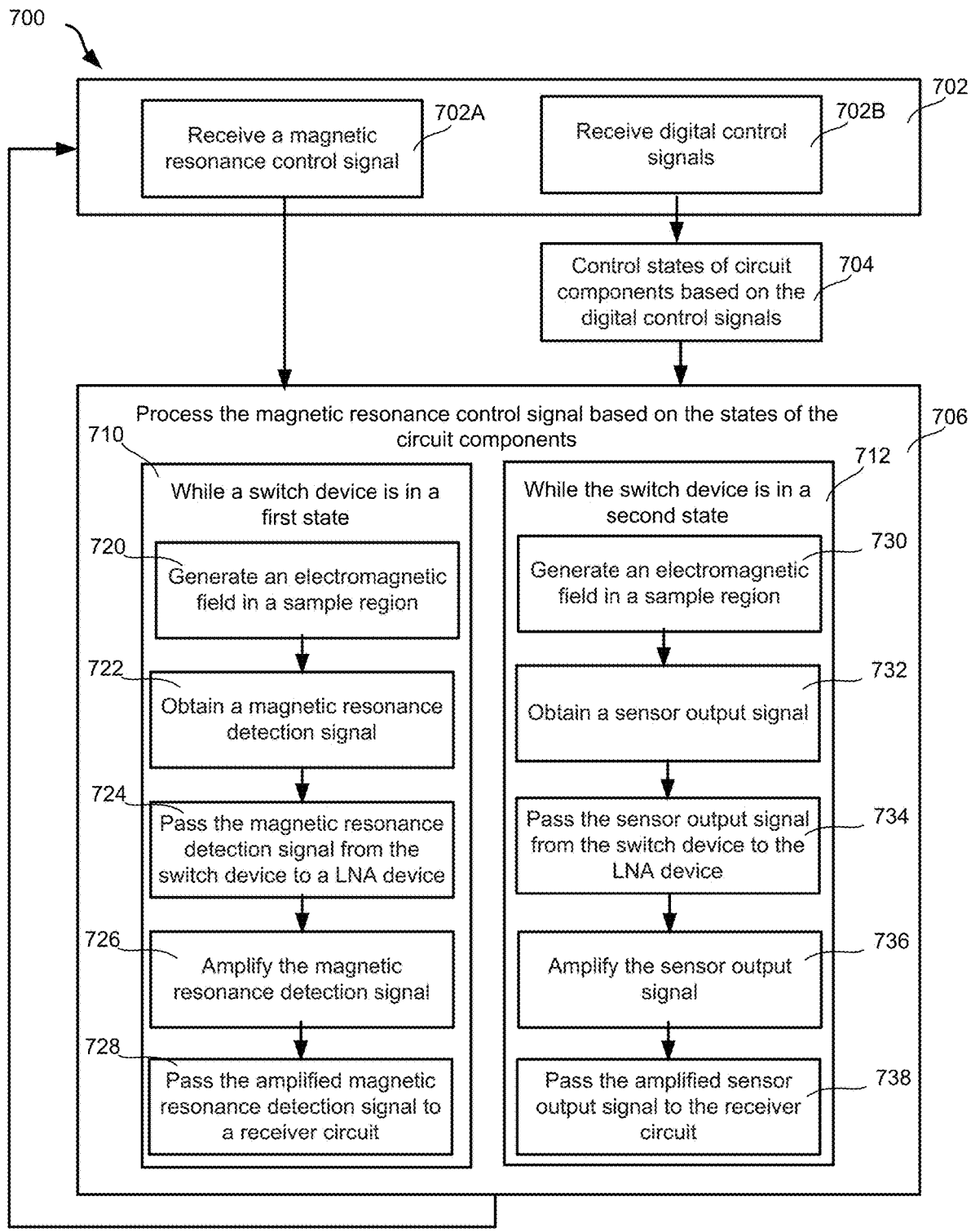
FIG. 7 is a flow diagram showing aspects of an example process for operating the example resonator circuits shown in FIGS. 6A-6B.

FIG. 7 is a flow diagram showing aspects of an example process 700. In some cases, the operations in the example process 700 shown in FIG. 7 are implemented as processes to switch between a normal mode of operation in a magnetic resonance measurement (e.g., continuous-wave or pulsed mode) and a digitization/correction mode with a nanosecond switching time. The example process 700 can be performed, for example, by operation of a resonator circuit. For instance, operations in the example process 700 may be performed by either of the example resonator circuits 600, 630 shown in FIG. 6A-6B or another type of circuit. The example process 700 may include additional or different operations, including operations performed by additional or different components, and the operations may be performed in the order shown or in another order. In some cases, operations in the example process 700 can be combined, iterated or otherwise repeated or performed in another manner during a magnetic resonance measurement.

At 702, signals are received. As shown in FIG. 7, the operation 702 includes two sub-operations 702A, 702B. During the sub-operation 702A, the magnetic resonance control signal is received at the first port 622A, 652A of the resonator circuit 600, 630, for example, as part of the resonator unit 108 of the magnetic resonance system 100 in FIG. 1. In some implementations, the magnetic resonance control signal may be generated by the signal processing unit 102 and the spectrometer unit 104 of the magnetic resonance system 100 in FIG. 1 or in another manner. During sub-operation 702B, the digital control signals are received at the control ports 624A, 624B, 654A, 654B of the resonator circuits 600, 630, for example, from the signal processing unit 102 of the magnetic resonance system 100 in FIG. 1.

At 704, states of the circuit components are controlled based on the digital control signals. In some implementations, the states of the first and second switch devices 602, 606 in the resonator circuit 600 and the states of the first and second switch devices 632, 636 in the resonator circuit 630 are controlled based on the states of the digital control signals received at the control ports 624A, 624B, 654A, 654B. In particular, when the digital control signal received by the first switch device 602 at the control port 624A is in a first state (e.g., the logic high level), the first switch device 602 of the example resonator circuit 600 in FIG. 6A is in a first state; and the first port 622A is coupled to the output port of the first switch device 602, which allows delivery of the magnetic resonance control signal from the first port 622A to the output port of the first switch device 602 with no attenuation or negligible attenuation. When the digital control signal received by the first switch device 602 at the control port 624A is in a second state (e.g., the logic low level), the first switch device 602 is in a second state where the first port 622A is decoupled from the output port of the first switch device 602. When the digital control signal received by the first switch device 632 at the control port 654A is in a first state (e.g., the logic high level), the first switch device 632 is in the first state; and the first port 652A is coupled to the input/output port of the circulator device 633, which allows delivery of the magnetic resonance control signal from the input port 652A to the input port of the circulator device 633 with no attenuation or negligible attenuation. In some instances, the digital control signal received by the first switch device 602, 632 is a single-bit digital control signal or other types of digital control signals.

In some implementations, when the digital control signal received by the second switch device 606, 636 at the control port 624B, 654B is in a first state (e.g., the logic high level), the second switch device 606, 636 of the example resonator circuit 600, 630 in FIGS. 6A, 6B is in a first state; and the input port of the second switch device 606, 636 is coupled to the first output port of the second switch device 606, 636, which allows delivery of the magnetic resonance detection signal from the input port to the first output port of the second switch device 606, 636 with no attenuation or negligible attenuation. Under the first state of the second switch device 606, 636, the input port is decoupled from the second output port of the second switch device 606, 636. In some implementations, when the digital control signal received by the second switch device 606, 636 at the control port 624B, 654B is in a second state (e.g., the logic low level), the second switch device 606, 636 of the example resonator circuit 600, 630 in FIGS. 6A, 6B is in a second state. When the second switch device 606, 636 is in the second state, the input port of the second switch device 606, 636 is coupled to the second output port of the second switch device 606, 636, which allows delivery of the sensor output signal from the input port to the second output port of the second switch device 606, 636 with no attenuation or negligible attenuation. Under the second state of the second switch device 606, 636, the input port is decoupled from the first output port of the second switch device 606, 636.

At 706, the magnetic resonance control signal is processed based on the states of the circuit components of the resonator circuit 600, 630. The magnetic resonance control signal can be processed in two sub-routines, e.g., a first sub-routine 710 which includes operations 720, 722, 724, 726, 728 for performing a normal mode of operation in a magnetic resonance measurement; and a second sub-routine 712 which includes operations 730, 732, 734, 736, 738 for digitizing pulse transients and further for correcting or tuning the magnetic resonance control signal.

At 720 of the first sub-routine 710, an electromagnetic field is generated in a sample region of the resonator device 704, 734. In some instances, when the first switch device 602, 632 is in the first state, the magnetic resonance control signal is received at the resonator device 604, 634 from the first port 622A, 652A of the resonator circuit 600, 630 through the first switch device 602, 632. In some instances, when a magnetic resonance control signal is received at the resonator device 704, 734, an electromagnetic field is generated in the sample region of the magnetic resonance system according to the magnetic resonance control signal and configurations/characteristics of the resonator device 704, 734.

At 722 of the first sub-routine 710, a magnetic resonance detection signal is obtained. When the resonator device is a two-port resonator device (e.g., the resonator device 604 in FIG. 6A) configured to operate in transmission mode and while the first switch device 602 is in the first state, the magnetic resonance control signal is passed to the input port of the resonator device 604; and the magnetic resonance detection signal is passed via output port of the resonator device 604 to the first input port of the second switch device 606.

When the resonator device is a single-port resonator device (e.g., the resonator device 634 in FIG. 6B) having an input/output port and configured to operate in reflection mode and while the first switch device 632 is in the first state, the magnetic resonance control signal is passed to the input/output port of the resonator device 634 via the circulator device 633; and the magnetic resonance detection signal is obtained from the output port of the circulator device 633 and further passed to the first input port of the second switch device 636.

At 724 of the first sub-routine 710, when the second switch device 606, 636 is in the first state, the magnetic resonance detection signal received at the first input port of the second switch device 606, 636 is passed from the first input port to the output port of the second switch device 606, 636 and further to the LNA device 612, 642 of the resonator circuit 600, 630. In some instances, operation 724 may include additional sub-operations, e.g., passing the magnetic resonance detection signal from the second switch device 606, 636 to the LNA device 612, 642 through the bandpass filter device 608, 638 and/or the limiter device 610, 640.

The first sub-routine 710 continues with operation 726, during which the magnetic resonance detection signal is amplified by the LNA device 612, 642; and operation 728, during which the amplified magnetic resonance detection signal is passed to the receiver unit 110 of the magnetic resonance system 100 for a continuous-wave or pulsed magnetic resonance measurement. In certain instances, the first sub-routine 710 may include other operations and the operations of the first sub-routine 710 may be reordered according to the location of the bandpass filter device and the limiter device in the resonator circuit 600, 630 relative to other circuit components of the resonator circuit 600, 630.

At 730 of the second sub-routine 712, an electromagnetic field is generated in a sample region of the resonator device 604, 634. In some instances, when the first switch device 602, 632 is in the first state, the magnetic resonance control signal is received at the resonator device 604, 634 from the first port 622A, 652A of the resonator circuit 600, 630 through the first switch device 602, 632. In some instances, when a magnetic resonance control signal is received at the resonator device 604, 634, an electromagnetic field is generated in the sample region of the magnetic resonance system according to the magnetic resonance control signal and configurations/characteristics of the resonator device 604, 634.

At 732 of the second sub-routine 712, a sensor output signal is obtained. The sensor output signal is obtained from the electromagnetic field sensor device 614, 644 and further passed to the second input port of the switch device 606, 636. The sensor output signal can be generated by a direct interaction between the electromagnetic field sensor device 614, 644 and the electromagnetic field generated by the resonator device at 730.

At 734 of the second sub-routine 712, when the second switch device 606, 636 is in the second state, the sensor output signal received at the second input port of the second switch device 606, 636 is passed to the output port of the second switch device 606, 636 and further passed to the LNA device 612, 642 of the resonator circuit 600, 630. In some instances, operation 724 may include additional sub-operations, e.g., passing the sensor output signal from the second switch device 606, 636 to the LNA device 612, 642 through the bandpass filter device 608, 638 and/or the limiter device 610, 640.

The second sub-routine 712 continues with operation 736, during which the sensor output signal is amplified by the LNA device 612, 642; and operation 738, during which the amplified sensor output signal is passed to the receiver unit of the magnetic resonance system for digitizing pulse transients. Results from the digitization process can be used for correcting the magnetic resonance control signal for subsequent magnetic resonance measurements. In certain instances, the second sub-routine 712 may include other operations and the operations of the second sub-routine 712 may be reordered according to the location of the bandpass filter device and the limiter device in the resonator circuit 600, 630 relative to other circuit components of the resonator circuit 600, 630.

In some cases, operations 702, 704, 706 (and possibly other operations) are executed as an iterative process, where each iteration includes receiving the magnetic resonance control signal and the digital control signals; switching the states of the first switch devices 602, 632 and the second switch devices 606, 636 in the resonator circuit 600, 630 between the first and second states according to the digital control signals; generating the magnetic resonance detection signal and the sensor output signal according to the magnetic resonance control signal; and delivering the magnetic resonance detection signal and the sensor output signal to the receiver unit of the magnetic resonance system. Each iteration of the iterative process may include additional operations. During each iteration, different sub-routines 710, 712 can be selected based on the states of the circuit components and used for performing pulsing/transient digitization or for performing spin signal acquisition during a continuous-wave or pulsed magnetic resonance measurement. Operations 702, 704, 706 may be repeated arbitrarily and in any order during the same magnetic resonance measurement.

FIG. 8A, 8B are timing diagrams 800, 820 showing aspects of example control sequences. The control sequences indicate the states of example digital control signals received by the switch devices at the respective control ports of the amplifier circuit 200 as shown in FIG. 2 and the resonator circuits 400, 430, 600, 630 as shown in FIGS. 4A-4B and 6A-6B. In some instances, the control sequences are applied during operations of the example processes 300, 500, 700 or in another process. In FIGS. 8A-8B, $t_p$ represents the length of a given pulse; $t_p + t_s$ represents the length of a given pulse plus switching times; $t_{dead}$ represents the spectrometer deadtime; and $t_{acq}$ represents the acquisition time of the spin signal. In some implementations, the timing diagram 800 shown in FIG. 8A is configured to perform a magnetic resonance measurement in continuous-wave mode; and the timing diagram 820 shown in FIG. 8B is used for performing a magnetic resonance measurement in pulsed mode. In some instances, the timing diagrams 800, 820 may be selected and augmented to one another to form a pulse program where magnetic resonance measurements in different modes can be performed in a single experiment or in several experiments. In other words, control sequences can be executed sequentially or repeatedly according to timing diagrams in a pulse program such that different modes of magnetic resonance measurements can be arbitrarily switched and performed.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media.

Some of the operations described in this specification can be implemented as operations performed by a data processing apparatus on data stored on one or more computer-readable storage devices or received from other sources.

In a general aspect of what is described above, a magnetic resonance system is operated.

In a first example, an amplifier circuit for a magnetic resonance system includes a first switch device, a high-power amplifier (HPA) device, a second switch device, and a power combiner device. The first switch device includes an input port, a first output port, a second output port and a control port. The input port of the first switch device is configured to receive a magnetic resonance control signal. The control port of the first switch device is configured to receive a first digital control signal. The first switch device is configured to selectively couple the input port of the first switch device with the first output port or the second output port of the first switch device based on a state of the first digital control signal. The HPA device includes an HPA input port and an HPA output port. The HPA input port is coupled to the first output port of the first switch device. The second switch device includes an input port, an output port and a control port. The control port of the second switch device is configured to receive a second digital control signal. The second switch device is configured to selectively couple the input port of the second switch device with the output port of the second switch device based on a state of the second digital control signal. The power combiner device includes a first input port, a second input port and an output port. The first input port of the power combiner device is coupled to the output port of the second switch device. The second input port of the power combiner device is coupled to the second output port of the first switch device along a path that bypasses the HPA device. The output port of the power combiner device is configured to be coupled to a resonator circuit of the magnetic resonance system.

Implementations of the first example may include one or more of the following features. The amplifier circuit is configured to operate at room temperature; and the resonator circuit is configured to operate at a cryogenic temperature. The amplifier circuit is configured to operate at room temperature; and at least a portion of the resonator circuit is configured to operate at room temperature. The amplifier circuit includes a bandpass filter device coupled between the HPA output port and the first input port of the power combiner device. The first switch device is configured to switch between a first state and a second state in response to a change in the state of the first digital control signal. The first state includes the input port of the first switch device coupled with the first output port of the first switch device and decoupled from the second output port of the first switch device. The second state includes the input port of the first switch device coupled with the second output port of the first switch device and decoupled from the first output port of the first switch device. A switch time of the first switch device is equal to or less than 1 µs. The second switch device is configured to switch between a first state and a second state in response to a change in the state of the second digital control signal. The first state includes the input port of the second switch device coupled with the output port of the second switch device. The second state comprises the input port of the second switch device decoupled from the output port of the second switch device. A switch time of the second switch device is equal to or less than 1 µs.

In a second example, an amplifier circuit in a magnetic resonance system includes a first switch device, a high-power amplifier (HPA) device, a second switch device, and a power combiner device, the method of operating the amplifier circuit includes: while the first switch device is in a first state, receiving a first magnetic resonance control signal at the first switch device; passing the first magnetic resonance control signal from the first switch device to the HPA device; amplifying the first magnetic resonance control signal by operation of the HPA device; at the second switch device, receiving an amplified magnetic resonance signal from the HPA device; passing the amplified magnetic resonance signal through the second switch device to the power combiner device; and providing a first output of the power combiner device to a resonator circuit of the magnetic resonance system; switching the first switch device from the first state to a second state in response to a digital control signal received by the first switch device; and while the first switch device is in the second state, receiving a second magnetic resonance control signal at the first switch device; passing the second magnetic resonance control signal from the first switch device to the power combiner device, wherein passing the second magnetic resonance control signal from the first switch device to the power combiner device bypasses the HPA; providing a second output of the power combiner device to the resonator circuit of the magnetic resonance system.

Implementations of the second example may include one or more of the following features. The amplifier circuit operates at room temperature. The resonator circuit operates at a cryogenic temperature. The amplifier circuit is configured to operate at room temperature; and at least a portion of the resonator circuit is configured to operate at room temperature. Passing the amplified magnetic resonance signal through the second switch device to the power combiner device comprises passing the amplified magnetic resonance signal through a bandpass filter device to the power combiner device.

In a third example, a resonator circuit is configured to operate in a cryogenic environment of a magnetic resonance system. The resonator circuit includes a resonator device and a low-noise amplifier (LNA) device. The resonator device includes an input port, an output port, and a resonator coupled between the input port and the output port. The input port of the resonator device is configured to receive a magnetic resonance control signal. The resonator device is configured to generate an electromagnetic field in a sample region of the magnetic resonance system in response to the magnetic resonance control signal. The LNA device includes an LNA input port and an LNA output port. The LNA input port is coupled to the output port of the resonator device. The LNA output port is configured to be coupled to a receiver circuit of the magnetic resonance system.

Implementations of the third example may include one or more of the following features. The amplifier circuit includes switch device coupled between the output port of the resonator device and the LNA input port. The switch device includes an input port, a first output port and a second output port. The resonator circuit includes a limiter device coupled between the first output port of the switch device and the LNA input port. The limiter device includes an input port and an output port. The resonator circuit includes a bandpass filter device coupled between the first output port of the switch device and the input port of the limiter device. The switch device includes a control port configured to receive a digital control signal. The switch device is configured to switch between a first state and a second state in response to a change in a state of the digital control signal. The first state includes the input port of the switch device coupled with the first output port of the switch device and decoupled from the second output port of the switch device. The second state includes the input port of the switch device coupled with the second output port of the device and decoupled from the first output port of the switch device.

Implementations of the third example may include one or more of the following features. The amplifier circuit includes a switch device. The switch device includes an input port and an output port. The output port of the switch device is coupled to the input port of the resonator device and the input port of the switch device is configured to receive the magnetic resonance control signal. The switch device includes a control port configured to receive a digital control signal. The switch device is configured to switch between a first state and a second state in response to a change in a state of the digital control signal. The first state includes the input port of the switch device coupled with the output port of the switch device. The second state includes the input port of the switch device decoupled from the output port of the switch device. A switch time of the switch device is equal to or less than 30 ns.

In a fourth example, a resonator circuit in a magnetic resonance system includes a resonator device and low-noise amplifier (LNA) device. The resonator device includes an input port, an output port and a resonator coupled between the input port and the output port. A method of operating the resonator circuit includes receiving a magnetic resonance control signal at the input port of the resonator device; by operation of the resonator device, generating an electromagnetic field in a sample region of the magnetic resonance system in response to the magnetic resonance control signal; by operation of the resonator device, obtaining a magnetic resonance detection signal based on an interaction between the resonator device and a sample in the sample region; providing the magnetic resonance detection signal from the output port of the resonator device to the LNA device; amplifying the magnetic resonance detection signal by operation of the LNA device; and providing the amplified magnetic resonance detection signal to a receiver circuit of the magnetic resonance system.

Implementations of the fourth example may include one or more of the following features. The resonator circuit includes a switch device. The method includes while the switch device is in a first state, receiving the magnetic resonance detection signal from the output port of the resonator device at the switch device; and passing the magnetic resonance detection signal from the switch device to the LNA device. The method includes prior to amplifying the magnetic resonance detection signal, passing the magnetic resonance detection signal from the switch device to a limiter device coupled between the switch device and the LNA device. The method includes switching the switch device from the first state to a second state in response to a digital control signal received by the switch device; and while the switch device is in the second state, receiving the magnetic resonance detection signal from the output port of the resonator device at the switch device; and passing the magnetic resonance detection signal from the switch device along a path that bypasses the LNA device.

Implementations of the fourth example may include one or more of the following features. The resonator circuit includes a switch device. A switch time of the switch device is equal to or less than 30 ns. The method includes prior to receiving the magnetic resonance control signal at the input port of the resonator device and while the switch device is in a first state, receiving the magnetic resonance control signal at the switch device; and passing the magnetic resonance control signal from the switch device to the input port of the resonator device.

In a fifth example, a resonator circuit is configured to operate in a cryogenic environment of a magnetic resonance system. The resonator circuit includes a resonator device, a switch device and a low-noise amplifier (LNA) device. The resonator device includes a resonator configured to generate an electromagnetic field in a sample region of the magnetic resonance system in response to a magnetic resonance control signal received by the resonator device. The switch device includes an input port, a first output port, a second output port, and a control port. The input port of the switch device is coupled with the resonator device. The control port of the switch device is configured to receive a digital control signal. The switch device is configured to selectively couple the input port of the switch device with the first output port or the second output port of the switch device based on a state of the digital control signal. The second output port of the switch device is configured to be coupled to a receiver circuit of the magnetic resonance system along a path that bypasses the low-noise amplifier (LNA) device. The LNA device includes an LNA input port and an LNA output port. The LNA input port is coupled to the first output port of the switch device. The LNA output port is configured to be coupled to the receiver circuit of the magnetic resonance system.

Implementations of the fifth example may include one or more of the following features. The resonator circuit includes a limiter device coupled between the first output port of the switch device and the LNA input port. The limiter device includes an input port and an output port. The resonator circuit includes a bandpass filter device coupled between the first output port of the switch device and the input port of the limiter device. The switch device is configured to switch between a first state and a second state in response to the change in the state of the digital control signal. The first state includes the input port of the switch device coupled with the first output port of the switch device and decoupled from the second output port of the switch device. The second state includes the input port of the switch device coupled with the second output port of the switch device and decoupled from the first output port of the switch device.

Implementations of the fifth example may include one or more of the following features. The resonator device includes an input port and an output port. The resonator device is configured to operate in transmission mode. The first input port of the switch device is coupled with the output port of the resonator device. The switch device is a first switch device. The resonator circuit includes a second switch device. The second switch device includes an input port and an output port. The output port of the second switch device is coupled to the input port of the resonator device and the input port of the second switch device is configured to receive the magnetic resonance control signal.

Implementations of the fifth example may include one or more of the following features. The digital control signal on the first switch device is a first digital control signal. The second switch device includes a control port configured to receive a second digital control signal and is configured to switch between a first state and a second state in response to a change in a state of the second digital control signal. The first state includes the input port of the second switch device coupled with the output port of the second switch device. The second state includes the input port of the second switch device decoupled from the output port of the second switch device. A switch time of the second switch device is equal to or less than 30 ns.

Implementations of the fifth example may include one or more of the following features. The resonator device includes an input/output port; and is configured to operate in reflection mode. The input port of the switch device is coupled with the input/output port of the resonator device. The switch device is a first switch device. The resonator circuit includes a circulator device and a second switch device. The circulator device includes an input port, an input/output port coupled to the input/output port of the resonator device, and an output port coupled to the first input port of the first switch device. The second switch device includes an input port configured to receive the magnetic resonance control signal and an output port coupled to the input port of the circulator device.

In a sixth example, a resonator circuit in a magnetic resonance system, the resonator circuit comprising a resonator device, a switch device, and low-noise amplifier (LNA) device. A method of operating the resonator circuit includes while the switch device is in a first state, receiving a first magnetic resonance control signal at the resonator device; by operation of the resonator, generating a first electromagnetic field in a sample region of the magnetic resonance system in response to the first magnetic resonance control signal; by operation of the resonator device, obtaining a first magnetic resonance detection signal based on an interaction between the resonator and a sample in the sample region; passing the first magnetic resonance detection signal through the switch device to the LNA device; amplifying the magnetic resonance detection signal by operation of the LNA device; passing the amplified output to a receiver circuit of the magnetic resonance system; switching the switch device from the first state to a second state in response to a digital control signal received at the switch device; and while the switch device is in the second state, receiving a second magnetic resonance control signal at the resonator device; by operation of the resonator device, generating a second electromagnetic field in the sample region of the magnetic resonance system in response to the second magnetic resonance control signal; by operation of the resonator device, obtaining a second magnetic resonance detection signal based on an interaction between the resonator and the sample; passing the second magnetic resonance detection signal through the switch device to the receiver circuit along a path that bypasses the LNA device.

Implementations of the sixth example may include one or more of the following features. The resonator circuit includes a limiter device. Passing the first magnetic resonance detection signal through the switch device to the LNA device includes receiving the first magnetic resonance detection signal at the limiter device from the switch device; and passing the first magnetic resonance detection signal from the limiter device to the LNA device. The resonator circuit includes a bandpass filter device. Passing the first magnetic resonance detection signal through the switch device to the LNA device includes receiving the first magnetic resonance detection signal at the bandpass filter device from the switch device; and passing the first magnetic resonance detection signal from the bandpass filter device to the limiter device.

Implementations of the sixth example may include one or more of the following features. The resonator device includes an input port and an output port. The resonator device is configured to operate in transmission mode. Passing the first magnetic resonance detection signal through the switch device to the LNA device includes passing the first magnetic resonance detection signal from the output port of the resonator device to the LNA device through the switch device. Passing the second magnetic resonance detection signal through the switch device to the receiver circuit along a path that bypasses the LNA device includes passing the second magnetic resonance detection signal from the output port of the resonator device to the receiver circuit along the path that bypasses the LNA device.

Implementations of the sixth example may include one or more of the following features. The switch device is a first switch device, the resonator circuit comprises a second switch device. A switch time of the second switch device is equal to or less than 30 ns, The method includes receiving the first or second magnetic resonance control signal at the second switch device; and passing the first or second magnetic resonance control signal from the second switch device to the input port of the resonator device.

Implementations of the sixth example may include one or more of the following features. The resonator device includes an input/output port and is configured to operate in reflection mode. Passing the first magnetic resonance detection signal through the switch device to the LNA device includes passing the first magnetic resonance detection signal from the input/output port of the resonator device to the LNA device through the switch device. Passing the second magnetic resonance detection signal through the switch device to the receiver circuit along a path that bypasses the LNA device includes passing the second magnetic resonance detection signal from the input/output port of the resonator device to the receiver circuit along the path that bypasses the LNA device. The switch device is a first switch device. The resonator circuit includes a circulator device and a second switch device. The circulator device includes an input port, an input/output port, and an output port. The second switch device includes an input port and an output port. The method includes while the second switch device is at a first state, receiving the first or second magnetic resonance control signal at the input port of the second switch device; passing the first or second magnetic resonance control signal from the input port of the second switch device to the output port of the second switch device; passing the first or second magnetic resonance control signal from the input port of the circulator device to the input/output port of the resonator device through the input/output port of the circulator device; receiving the first or second magnetic resonance detection signal from the input/output port of the resonator device at the input/output port of the circulator device; and passing the first or second magnetic resonance detection signal from the input/output port of the circulator device to the first switch device through the output port of the circulator device.

In a seventh example, a resonator circuit is configured to operate in a cryogenic environment of a magnetic resonance system. The resonator circuit includes a resonator device, an electromagnetic field sensor device, and a switch device. The resonator device includes a resonator configured to generate an electromagnetic field in a sample region of the magnetic resonance system in response to a magnetic resonance control signal received by the resonator device. The electromagnetic field sensor device is configured to sense the electromagnetic field generated by the resonator device. The switch device includes a first input port, a second input port, an output port, and a control port. The first input port of the switch device is coupled with the resonator device. The second input port of the switch device is coupled with the electromagnetic field sensor device. The control port of the switch device is configured to receive a digital control signal. The output port of the switch device is configured to be coupled to a receiver circuit of the magnetic resonance system. The switch device is configured to selectively couple the first input port of the switch device or the second input port of the switch device with the output port of the switch device depending on a state of the digital control signal.

Implementations of the seventh example may include one or more of the following features. The resonator circuit includes a low-noise amplifier (LNA) device. The LNA device includes an LNA input port and an LNA output port. The LNA input port is coupled to the output port of the switch device, and the LNA output port is configured to be coupled to the receiver circuit. The resonator circuit includes a limiter device coupled between the output port of the switch device and the LNA input port. The limiter device includes an input port and an output port. The resonator circuit includes a bandpass filter device coupled between the output port of the switch device and the input port of the limiter device.

In a seventh example, a resonator circuit is configured to operate in a cryogenic environment of a magnetic resonance system. The switch device is configured to switch between a first state and a second state in response to the change in the state of the digital control signal. The first state includes the output port of the switch device coupled with the first input port of the switch device and decoupled from the second input port of the switch device. The second state includes the output port of the switch device coupled with the second input port of the switch device and decoupled from the first input port of the switch device.

In a seventh example, a resonator circuit is configured to operate in a cryogenic environment of a magnetic resonance system. The resonator device includes an input port and an output port and is configured to operate in transmission mode. The first input port of the switch device is coupled with the output port of the resonator device. The switch device is a first switch device. The resonator circuit includes a second switch device. The second switch device includes an input port and an output port. The output port of the second switch device is coupled to the input port of the resonator device, and the input port of the second switch device is configured to receive the magnetic resonance control signal.

In a seventh example, a resonator circuit is configured to operate in a cryogenic environment of a magnetic resonance system. The digital control signal on the first switch device is a first digital control signal. The second switch device includes a control port configured to receive a second digital control signal and is configured to switch between a first state and a second state in response to a change in a state of the second digital control signal. The first state includes the input port of the second switch device coupled with the output port of the second switch device. The second state includes the input port of the second switch device decoupled from the output port of the second switch device. A switch time of the second switch device is equal to or less than 30 ns.

In a seventh example, a resonator circuit is configured to operate in a cryogenic environment of a magnetic resonance system. The resonator device includes an input/output port and is configured to operate in reflection mode. The first input port of the switch device is coupled with the input/output port of the resonator device. The switch device is a first switch device. The resonator circuit includes a circulator device and a second switch device. The circulator device includes an input port, an input/output port coupled to the input/output port of the resonator device, and an output port coupled to the first input port of the first switch device. The second switch device includes an input port configured to receive the magnetic resonance control signal, and an output port coupled to the input port of the circulator device. The electromagnetic field sensor device includes a coil device for sensing a magnetic field. The electromagnetic field sensor device includes a resistor device for sensing an electrical field.

In an eighth example, a resonator circuit in a magnetic resonance system, the resonator circuit comprising a resonator device, an electromagnetic field sensor, and a switch device. A method of operating the resonator circuit includes while the switch device is in a first state, receiving a first magnetic resonance control signal at the resonator device; by operation of the resonator, generating a first electromagnetic field in a sample region of the magnetic resonance system in response to the first magnetic resonance control signal; by operation of the resonator device, obtaining a first magnetic resonance detection signal based on an interaction between the resonator and a sample in the sample region; passing the first magnetic resonance detection signal through the switch device to a receiver circuit of the magnetic resonance system; switching the switch device from the first state to a second state in response to a digital control signal received at the switch device; and while the switch device is in the second state, receiving a second magnetic resonance control signal at the resonator device; by operation of the resonator device, generating a second electromagnetic field in the sample region of the magnetic resonance system in response to the second magnetic resonance control signal; by operation of the electromagnetic field sensor, generating a sensor output signal based on an interaction between the second electromagnetic field and the electromagnetic field sensor; passing the sensor output signal through the switch device to the receiver circuit.

Implementations of the eighth example may include one or more of the following features. The resonator circuit includes a low-noise amplifier (LNA) device. The method includes, prior to passing the first magnetic resonance detection signal through the switch device to the receiver circuit, passing the first magnetic resonance detection signal from the switch device through the LNA device; and prior to passing the sensor output signal through the switch device to the receiver circuit, passing the sensor output signal from the switch device through the LNA device.

Implementations of the eighth example may include one or more of the following features. The resonator circuit includes a limiter device. Passing the first magnetic resonance detection signal from the switch device to the LNA device includes passing the first magnetic resonance detection signal from the switch device to the LNA device through the limiter device; and passing the sensor output signal from the switch device to the LNA device includes passing the sensor output signal from the switch device to the LNA device through the limiter device.

Implementations of the eighth example may include one or more of the following features. The resonator circuit includes a bandpass filter device. The method includes: passing the first magnetic resonance detection signal from the switch device to the limiter device through the bandpass filter device; and passing the sensor output signal from the switch device to the limiter device through the bandpass filter device.

Implementations of the eighth example may include one or more of the following features. The resonator device includes an input port and an output port and is configured to operate in transmission mode. Passing the first magnetic resonance detection signal through the switch device to the receiver circuit of the magnetic resonance system includes passing the first magnetic resonance detection signal from the output port of the resonator device to the receiver circuit of the magnetic resonance system through the switch device.

Implementations of the eighth example may include one or more of the following features. The switch device is a first switch device. The resonator circuit includes a second switch device. A switch time of the second switch device is equal to or less than 30 ns. The method includes receiving the first or second magnetic resonance control signal at the second switch device; and passing the first or second magnetic resonance control signal from the second switch device to the input port of the resonator device.

Implementations of the eighth example may include one or more of the following features. The resonator device includes an input/output port and is configured to operate in reflection mode. Passing the first magnetic resonance detection signal through the switch device to the receiver circuit of the magnetic resonance system includes: passing the first magnetic resonance detection signal from the input/output port of the resonator device to the receiver circuit of the magnetic resonance system through the switch device.

Implementations of the eighth example may include one or more of the following features. The switch device is a first switch device. The resonator circuit includes a circulator device and a second switch device. The circulator device includes an input port, an input/output port, and an output port. The second switch device includes an input port and an output port. The method includes while the second switch device is at a first state, receiving the first or second magnetic resonance control signal at the input port of the second switch device; passing the first or second magnetic resonance control signal from the input port of the second switch device to the output port of the second switch device; passing the first or second magnetic resonance control signal from the input port of the circulator device to the input/output port of the resonator device through the input/output port of the circulator device; receiving the first magnetic resonance detection signal from the input/output port of the resonator device at the input/output port of the circulator device; and passing the first magnetic resonance detection signal from the input/output port of the circulator device to the first switch device through the output port of the circulator device.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of examples have been described. Nevertheless, it will be understood that various modifications can be made. Accordingly, other examples are within the scope of the following claims.

What is claimed is:

1. A resonator circuit configured to operate in a cryogenic environment of a magnetic resonance system, the resonator circuit comprising:
    a first switch device configured to receive a magnetic resonance control signal;
    a resonator device comprising a resonator, the resonator device configured to receive the magnetic resonance control signal from the first switch device and generate an electromagnetic field in a sample region of the magnetic resonance system in response to the magnetic resonance control signal;
    a low-noise amplifier (LNA) device coupled between the resonator device and a receiver circuit of the magnetic resonance system; and
    a second switch device coupled between the resonator device and the LNA device.

2. The resonator circuit of claim 1, comprising a limiter device coupled between the resonator device and the LNA device.

3. The resonator circuit of claim 2, comprising a bandpass filter device coupled between the resonator device and the limiter device.

4. The resonator circuit of claim 1, wherein:
    the first switch device comprises a control port configured to receive a digital control signal and is configured to switch between a first state and a second state in response to a change in a state of the digital control signal,
    the first state comprises an input port of the first switch device coupled with an output port of the first switch device,
    the second state comprises the input port of the first switch device decoupled from the output port of the first switch device, and
    a switch time of the first switch device is equal to or less than 30 nanoseconds (ns).

5. The resonator circuit of claim 1, wherein the resonator device comprises an input/output port and is configured to operate in reflection mode, and an output port of the first switch device is coupled with the input/output port of the resonator device.

6. The resonator circuit of claim 5, wherein the resonator circuit comprises a circulator device, and the output port of the first switch device is coupled to the input/output port of the resonator device through the circulator device.

7. The resonator circuit of claim 6, wherein the circulator device is a directional coupler device.

8. The resonator circuit of claim 6, wherein the circulator device is a quarter-wave transformer.

9. A method of operating a resonator circuit in a magnetic resonance system, the resonator circuit comprising a first switch device, a resonator device, a low-noise amplifier (LNA) device, and a second switch device, the method comprising:
    receiving a magnetic resonance control signal at the first switch device;
    passing the magnetic resonance control signal from the first switch device to the resonator device;
    by operation of the resonator device, generating an electromagnetic field in a sample region of the magnetic resonance system in response to the magnetic resonance control signal;
    by operation of the resonator device, obtaining a magnetic resonance detection signal based on an interaction between the resonator device and a sample in the sample region;
    while the second switch device is in a first state:
        receiving the magnetic resonance detection signal from the resonator device at the second switch device; and
        passing the magnetic resonance detection signal from the second switch device to the LNA device;
    amplifying the magnetic resonance detection signal by operation of the LNA device; and
    providing the amplified magnetic resonance detection signal to a receiver circuit of the magnetic resonance system.

10. The method of claim 9, comprising:
prior to amplifying the magnetic resonance detection signal, passing the magnetic resonance detection signal from the second switch device to a limiter device coupled between the second switch device and the LNA device.

11. The method of claim 9, comprising:
switching the second switch device from the first state to a second state in response to a digital control signal received by the second switch device; and
while the second switch device is in the second state:
receiving the magnetic resonance detection signal from the resonator device at the second switch device; and
passing the magnetic resonance detection signal from the second switch device along a path that bypasses the LNA device.

12. The method of claim 11, comprising:
switching the second switch device from the first state to the second state when the magnetic resonance system is switched between a measurement mode of operation and a pulse observation mode of operation.

13. The method of claim 9, wherein a switch time of the second switch device is equal to or less than 30 nanoseconds (ns).

14. The method of claim 9, wherein the resonator device comprises an input/output port and is configured to operate in reflection mode, and the method comprises:
passing the magnetic resonance control signal from an output port of the first switch device to the input/output port of the resonator device.

15. The method of claim 14, wherein the resonator circuit comprises a circulator device, and the method comprises passing the magnetic resonance control signal from the output port of the first switch device, through the circulator device, to the input/output port of the resonator device.

16. A resonator circuit configured to operate in a cryogenic environment of a magnetic resonance system, the resonator circuit comprising:
a switch device configured to receive a magnetic resonance control signal;
a resonator device comprising a resonator, the resonator device configured to receive the magnetic resonance control signal from the switch device and generate an electromagnetic field in a sample region of the magnetic resonance system in response to the magnetic resonance control signal;
a low-noise amplifier (LNA) device coupled between the resonator device and a receiver circuit of the magnetic resonance system;
a limiter device coupled between the resonator device and the LNA device; and
a bandpass filter device coupled between the resonator device and the limiter device.

17. The resonator circuit of claim 16, wherein the switch device is a first switch device, and the resonator circuit comprises a second switch device coupled between the resonator device and the bandpass filter.

18. A resonator circuit configured to operate in a cryogenic environment of a magnetic resonance system, the resonator circuit comprising:
a switch device comprising an input port, an output port, and a control port, the control port configured to receive a digital control signal, the switch device configured to receive a magnetic resonance control signal and to switch between a first state and a second state in response to a change in a state of the digital control signal, wherein:
the first state comprises the input port of the switch device coupled with the output port of the switch device,
the second state comprises the input port of the switch device decoupled from the output port of the switch device, and
a switch time of the switch device is equal to or less than 30 nanoseconds (ns);
a resonator device comprising a resonator, the resonator device configured to receive the magnetic resonance control signal from the switch device and generate an electromagnetic field in a sample region of the magnetic resonance system in response to the magnetic resonance control signal; and
a low-noise amplifier (LNA) device coupled between the resonator device and a receiver circuit of the magnetic resonance system.

19. The resonator circuit of claim 18, wherein the switch device is a first switch device, and the resonator circuit comprises a second switch device coupled between the resonator device and the LNA device.

20. A resonator circuit configured to operate in a cryogenic environment of a magnetic resonance system, the resonator circuit comprising:
a switch device configured to receive a magnetic resonance control signal, the switch device comprising an output port;
a circulator device;
a resonator device comprising a resonator, the resonator device configured to receive the magnetic resonance control signal from the switch device and generate an electromagnetic field in a sample region of the magnetic resonance system in response to the magnetic resonance control signal, the resonator device comprising an input/output port and being configured to operate in reflection mode, the input/output port being coupled with the output port of the switch device through the circulator device; and
a low-noise amplifier (LNA) device coupled between the resonator device and a receiver circuit of the magnetic resonance system.

21. The resonator circuit of claim 20, wherein the switch device is a first switch device, and the resonator circuit comprises a second switch device coupled between the resonator device and the LNA device.

22. A method of operating a resonator circuit in a magnetic resonance system, the resonator circuit comprising a switch device, a circulator device, a resonator device, and a low-noise amplifier (LNA) device, the switch device comprising an output port, the resonator device comprising an input/output port and configured to operate in reflection mode, the method comprising:
receiving a magnetic resonance control signal at the switch device;
passing the magnetic resonance control signal from the output port of the switch device to the input/output port the resonator device through the circulator device;
by operation of the resonator device, generating an electromagnetic field in a sample region of the magnetic resonance system in response to the magnetic resonance control signal;
by operation of the resonator device, obtaining a magnetic resonance detection signal based on an interaction between the resonator device and a sample in the sample region;
providing the magnetic resonance detection signal from the resonator device to the LNA device;

amplifying the magnetic resonance detection signal by operation of the LNA device; and providing the amplified magnetic resonance detection signal to a receiver circuit of the magnetic resonance system.

23. The method of claim 22, wherein the switch device is a first switch device, the resonator circuit comprises a second switch device, and providing the magnetic resonance detection signal from the resonator device to the LNA device comprises:

while the second switch device is in a first state:
  receiving the magnetic resonance detection signal from the resonator device at the second switch device; and
  passing the magnetic resonance detection signal from the second switch device to the LNA device.

* * * * *